(12) United States Patent
McAlhaney

(10) Patent No.: US 8,364,544 B2
(45) Date of Patent: Jan. 29, 2013

(54) COMPREHENSIVE ONLINE BIDDING AND SALES MANAGEMENT SYSTEM FOR MERCHANT PROCESSING SERVICES

(75) Inventor: David McAlhaney, Highland Park, IL (US)

(73) Assignee: Prairie Pacific Holdings, LLC, Highland Park, IL (US)

( * ) Notice: Subject to any disclaimer, the term of this patent is extended or adjusted under 35 U.S.C. 154(b) by 169 days.

(21) Appl. No.: 12/818,210

(22) Filed: Jun. 18, 2010

(65) Prior Publication Data

US 2011/0313869 A1    Dec. 22, 2011

(51) Int. Cl.
*G06Q 20/00* (2006.01)
(52) U.S. Cl. .................... 705/16; 705/1; 705/7; 705/14; 705/26; 705/39; 705/40; 705/51; 705/37; 705/35; 705/41; 705/38; 705/21; 705/34; 705/42; 705/44; 235/375; 235/379; 235/380; 235/381
(58) Field of Classification Search ...................... 705/16
See application file for complete search history.

(56) References Cited

U.S. PATENT DOCUMENTS

| | | | |
|---|---|---|---|
| 5,704,017 A | 12/1997 | Heckerman et al. | |
| 5,794,207 A | 8/1998 | Walker et al. | |
| 5,852,812 A | 12/1998 | Reeder | |
| 6,487,541 B1 | 11/2002 | Aggarwal et al. | |
| 6,647,373 B1 | 11/2003 | Carlton-Foss | |
| 6,752,313 B1 | 6/2004 | Caviles et al. | |
| 6,895,385 B1 | 5/2005 | Zacharia et al. | |
| 6,999,943 B1 | 2/2006 | Johnson et al. | |
| 7,020,633 B2 | 3/2006 | Strayer et al. | |
| 7,043,451 B2 | 5/2006 | Strayer et al. | |
| 7,146,331 B1 | 12/2006 | Young | |
| 7,356,484 B2 | 4/2008 | Benjamin et al. | |
| 7,401,034 B1 | 7/2008 | Srivastava et al. | |
| 7,424,455 B2 | 9/2008 | Kellogg et al. | |
| 7,430,523 B1 | 9/2008 | Khalidi | |
| 7,451,107 B1 | 11/2008 | Chvala et al. | |
| 7,603,312 B2 | 10/2009 | McElroy et al. | |
| 7,610,233 B1 | 10/2009 | Leong et al. | |
| 7,657,461 B2 | 2/2010 | Young | |
| 2002/0065762 A1 | 5/2002 | Lee et al. | |
| 2002/0095303 A1 | 7/2002 | Asayama et al. | |
| 2002/0103752 A1 | 8/2002 | Berger et al. | |
| 2002/0147674 A1 | 10/2002 | Gillman | |
| 2003/0041007 A1 | 2/2003 | Grey et al. | |

(Continued)

OTHER PUBLICATIONS

Rahman, Shaikh Mahfuzur. Optimal Contracting and Vertical Coordination in the Beef Industry: An Assessment of Value-Based Pricing. 2007, Dept. of Agricultural and Resource Econonomics (University of Maryland College Park).*

(Continued)

*Primary Examiner* — F. Zeender
*Assistant Examiner* — Fawaad Haider
(74) *Attorney, Agent, or Firm* — Reed Smith LLP

(57) ABSTRACT

A comprehensive online bidding and sales management system and method for merchant processing services of global credit card transactions. Merchants using the system can obtain multiple bid proposals for merchant processing services from sales representatives that are automatically ranked by the system based on the best overall price (estimated monthly expense to merchant) and feedback provided by merchants using the system. The merchant is thus provided with an estimated monthly expense and bid ranking associated with each bid proposal. The system provides the sales representative with its estimated revenues and processing expenses, and provides various merchant processing pricing models to the sales representative to analyze its bid proposals and merchant sales opportunities.

19 Claims, 26 Drawing Sheets

U.S. PATENT DOCUMENTS

| | | |
|---|---|---|
| 2003/0105709 A1 | 6/2003 | Orlando |
| 2004/0024707 A1 | 2/2004 | Perre et al. |
| 2004/0054625 A1 | 3/2004 | Kellogg et al. |
| 2004/0088238 A1 | 5/2004 | Gilson et al. |
| 2004/0267673 A1 | 12/2004 | Ballard et al. |
| 2005/0027648 A1 | 2/2005 | Knowles et al. |
| 2007/0043651 A1 | 2/2007 | Ziao et al. |
| 2008/0046569 A1 | 2/2008 | DePue et al. |
| 2008/0097879 A1 | 4/2008 | Sadowski et al. |
| 2008/0120194 A1 | 5/2008 | Juras et al. |
| 2008/0270275 A1 | 10/2008 | McElroy et al. |
| 2008/0270290 A1 | 10/2008 | Harrington et al. |
| 2008/0294544 A1 | 11/2008 | Harrington et al. |
| 2009/0234748 A1 | 9/2009 | Skowronek et al. |
| 2009/0292647 A1 | 11/2009 | Porat et al. |

OTHER PUBLICATIONS

FeeFighters, http://feefighters.com [retrieved Jun. 17, 2010], 18 pages.

The Maculator™, http://mgoldmine.net [retrieved Jun. 17, 2010], 6 pages.

International Search Report for corresponding International Application PCT/US11/040613, Sep. 27, 2011.

Written Opinion of the International Search Report for corresponding International Application PCT/US11/040613, Sep. 27, 2011.

* cited by examiner

COMPREHENSIVE ONLINE BIDDING AND SALES MANAGEMENT SYSTEM FOR MERCHANT PROCESSING SERVICES

BACKGROUND OF THE INVENTION

1. Field of the Invention

The invention relates generally to a comprehensive online bidding and sales management system for merchant processing services of global credit card transactions including Visa, MasterCard, Discover and American Express.

2. Background of the Invention

Merchant processing services are well known in the art and generally refer to services that process electronic credit card transactions on behalf of merchants, such as consumer credit card, pin debit card, signature debit, commercial card, business card, prepaid and reward card transactions. Similar transactions could involve gift cards, private label cards, and electronic check transactions.

Merchant processing services are offered by various merchant acquirers, financial institutions, independent sales organizations (ISO), member service providers (MSP), or other third party processors.

A merchant that accepts credit cards as payment for goods or services will have a contractual relationship with a merchant acquirer for the settlement of its credit card transactions.

The merchant acquirer is typically a financial institution which is a member of a Visa, MasterCard, or Discover card association. The financial institution may enter into a contractual relationship with an ISO, MSP or third party processor to outsource its obligation to the associations. Merchants typically select a merchant acquirer to provide customer service, to offer reporting, to offer settlement services and make daily deposits, to provide chargeback and retrieval services, to install point-of-sale equipment or software that can be leased or purchased, train the merchant's staff in the use of the equipment, access a credit card network for authorizations of credit card transactions, and ultimately process the merchant's credit card transactions. The merchant acquirer may offer the merchant processing services itself or outsource some or all of its merchant processing services to an authorized third party provider of merchant processing services.

There are typically three institutions involved in processing credit card transactions, the acquiring bank, an issuing bank, and a card association. Well known card associations include, for example, Visa, MasterCard and Discover.

The acquiring bank typically has a merchant processing relationship with a card association such as Visa, MasterCard or Discover, and is considered a member bank authorized to set up merchant accounts directly with merchants. An ISO or MSP offering merchant processing services must typically be sponsored by a member bank to market and sell merchant processing services to merchants on behalf of the member bank.

The issuing bank is the financial institution that issues a credit card to a cardholder that purchases goods and services from merchants. An issuing bank may issue different card types such as Visa, MasterCard or Discover to various market segments and card type categories such as consumer, signature debit, pin debit, rewards, commercial, business, prepaid, and check card.

The card associations typically operate between the acquiring bank and issuing bank to facilitate the large number of credit card transactions occurring on a daily basis. The typical credit card transaction begins at the point of sale where the cardholder has selected certain goods or services to purchase. The merchant typically enters the credit card number by swiping the card through a point-of-sale terminal to read information stored on the magnetic strip or manually enters the bank card number directly into the point-of-sale terminal or other electronic device. The point-of-sale terminal is connected to a computer credit card network which electronically links the merchant to the acquiring bank or merchant processing provider. The acquiring bank is electronically linked to the card association and the card association is electronically linked to the issuing bank. The network allows the merchant to verify the consumer has available credit to obtain goods or services they are attempting to purchase. The network allows for merchants to settle their point of sale device, thereby, ensuring the merchant will receive monies owed to them by the issuing bank.

In actual business practice, there can be variations and exceptions to the above described set up. For example, the acquiring bank and the issuing bank may be one in the same. Moreover, the acquiring bank and issuing bank often contract out one or more of the above support functions to independent sales organizations, member service providers or third party processors. The merchant processors operate and function on behalf of the bank to complete the transaction for the merchant and cardholder.

Various transaction fees are associated with the provision of merchant processing services for credit card transactions, and are well known in the art. Among these transaction fees are processing fees of the acquiring bank and merchant processor, interchange fees paid to the issuing bank, and assessment fees paid to the card association. Each time a credit card transaction is processed, the transaction fees are incurred by the merchant.

As known in the art, merchants may be charged any number of fees by merchant acquirers including a set up fee for each merchant account, a monthly rental or lease fee for the point of sale equipment or software, a percentage fee on each transaction, a per item transaction fee for each transaction, a per item authorization fee for each transaction, a monthly maintenance fee for each account, and a monthly minimum discount fee. Each of these fees varies from one merchant acquirer to the next and from one transaction to the next.

Such transaction fees could also encompass a discount expense, surcharge expense, assessment fee, monthly minimum fee, monthly authorization fee, pin debit fee, monthly batch fee, customer service fee, statement fee, application fee, membership fee, chargeback fee, retrieval fee, automated clearinghouse (ACH) fee, payment card industry (PCI) certification fee and an annual PCI fee.

A discount rate is typically the percentage charged to the merchant by the acquiring institution on either net or gross credit card volume generated by the merchant for goods and services sold. The discount rate will typically include interchange and assessment expenses.

The true management of the discount rate by the merchant is seldom evaluated when shopping for a new merchant processing relationship. For example, the minimum interchange rate a merchant can pay is typically 1.15% and the maximum interchange rate is typically 2.81%. This leaves a 1.66% variance the merchant can manage. Most merchants do not have the time, resources or complete understanding of how their credit card fee structure is administered.

The interchange fee paid by the merchant is based on a rate established by the card associations (Visa, MasterCard and Discover) that is paid by the acquiring bank to the issuing bank as compensation for expenses associated with processing a credit card transaction. Interchange rates vary according to type of card being used by the cardholder and that of the merchant (e.g., retail, travel and entertainment, mail order) and the method of processing (e.g., paper, electronically via a point-of-sale terminal).

The process of applying a particular interchange rate to a credit card transaction is known as qualification. However, as the transaction characteristics vary from the qualified or partially qualified qualification criteria in a pass through, bundled or tier pricing plan, the interchange fee applied to the transaction will increase. The increase in the interchange fee helps offset the added risk or pay for additional cardholder benefits provided by the issuing institution. The interchange rates considered to be qualified vary by merchant type, type of card product being used, the manner in which the merchant submitted information to the acquirer, the amount and type of information being passed by merchant to acquirer, and the geographical location of the merchant. A partially qualified or non-qualified transaction may include the sales associate manually entering the credit card number rather than swiping the card.

Interchange qualification is difficult to understand in part because there are so many different factors considered for each transaction. Some are based on the merchant's retail industry status, some on the type of card product being presented for payment, some on the process used by the merchant to gain authorization for the transaction, some on the type of information received, and many on a combination of these factors. The interchange qualification and thus the interchange rate charged may depend, for example, on whether the credit card is processed electronically from the magnetic strip on the back of the card (swiped), manually by the merchant based on the information set forth on the card, or manually by the merchant based on information provided by the consumer over the telephone. In short, the number and complexity of these factors make it difficult for a merchant to know what its actual monthly expense will be for merchant processing services.

Interchange fees are also based on various interchange categories, such as retail, hotel, supermarket, gas station transactions, assigned to each credit card transaction. Each transaction may be assigned to one of several hundred different interchange categories. Understanding these different interchange categories can be quite difficult for merchants, often resulting in merchants incurring charges much greater than it anticipated for its merchant processing services, or at least not knowing the actual amount of fees it will incur each month for its merchant processing services. These interchange categories are numerous and difficult to understand in part because there are so many different kinds applied.

The amount of transaction fees are further complicated by the variety of card products a card association or issuing bank may offer. For example, Visa and MasterCard typically offer a range of card products such as consumer cards, check cards, corporate cards, business cards, pin debit cards, rewards cards, prepaid cards and so on. Each card product may be subject to different rules and regulations regarding the use, acceptance, and processing of the card product.

Merchant sales representatives of acquirers, banks, financial institutions, merchant processors, ISOs and associations typically solicit and sell merchant processing services. The traditional methods for selling merchant processing services include but are not limited to direct merchant solicitations and quotations for such services.

The process is highly competitive and diverse among sales representatives and thus renders it difficult for merchants to easily compare multiple quotations from different sales representatives each containing numerous rates and fees for the merchant processing services, or to understand the actual expenses that will be incurred by its business under each quotation.

Most merchants tend to rely on a quoted bundled rate, buy rate, or tiered rate from their acquiring bank or merchant processor when comparing processing alternatives. A bundled rate is typically considered a buy rate and can also encompass a tiered rate. The bundled rate, buy rate, or tiered rate is typically the sum amount of interchange, assessment fees and the processing fees bundled into a single percentage rate and per item fee.

Over 20% of all credit transactions, however, never receive the quoted bundled rate, buy rate, or tiered rate because the transaction did not qualify at the qualified interchange rate. Instead those transactions are down graded to a partially qualified or a non-qualified rate in a bundled or tier pricing plan. The down grades can easily add an additional half percent to the merchants overall credit card processing expense and in some cases it is as high as a full one percent. This means that a merchant can end up paying an additional fee ranging from several hundred dollars to thousands of dollars in unforeseen annual expenses.

In an interchange pass through pricing plan method offered by sales representatives, the merchant pays the published interchange rate and assessments by the associations. The merchant also pays for other fees, such as fees for authorization, processing, statements, and chargebacks. Typically, the, interchange pass through method applies transaction fees by adding a small percentage or mark-up to the actual interchange rate for every transaction. This ensures that a merchant only pays the actual interchange rate plus the mark-up that goes to their merchant service provider.

A bundled rate pricing plan method may also be offered by a sales representative, which method typically combines most applicable fees, such as the interchange rate paid to the issuer, assessments to the card associations, and processor fees paid to the merchant processor, into a single percentage rate and single per item fee referred to as a discount fee or discount rate, thus effectively hiding the actual processing fees that make up the bundled rate from the merchant. The discount fee is thus typically the fee charged on the total amount of the gross or net transaction. The bundled rate pricing method could also encompass a tiered rate pricing plan. Other pricing methods could also be offered to merchants by sales representatives.

With conventional methods of quoting merchant processing services to merchants, the merchant does not know the precise fees being charged or what its estimated monthly expenses will be for each quotation. With the numerous fees and various pricing schemes, businesses are easily confused about the prices involved with regard to acquiring merchant services. Different merchant acquirers often provide pricing proposals that are vague and inconsistent, creating confusion when a merchant is shopping around for the lowest price for merchant services.

Moreover, conventional quotations to merchants for merchant processing services typically do not provide a merchant with adequate information regarding whether the financial institutions and merchant processors bidding on its merchant processing services actually provide satisfactory customer service and technical support to the merchant.

Sales representatives, in turn, are faced with rising interchange rates, increased sales and marketing expenses, and eroding profit margins. It thus has become necessary for merchant sales representatives, processors and banks to look towards alternative means to generate affordable lead generation opportunities for merchant processing services.

Conventional methods of selling merchant processing services do not provide sales representatives with access to a large number of merchant leads, the ability to efficiently submit quotations to a large number of merchants seeking merchant processing services, or the ability to instantaneously and efficiently determine and analyze critical information regarding its breakeven rate, monthly net revenue, or the merchant's monthly savings associated with each bid proposal.

Nor do conventional methods provide the sales representative with the opportunity to instantaneously, efficiently and effectively adjust its bid proposal in relation to other bid proposals in order to provide the merchant with its most competitive bid while ensuring that its bid proposal stays within the financial parameters of managing its own business of selling merchant processing services.

Web based reverse auctions for selling products and services over a computer system are known in the art, as described for example in U.S. Pat. No. 6,647,373 to Carlton-Foss. In such systems, electronic reverse auction information is typically transmitted over an electronic network such as the Internet and the reverse auction system is able to securely receive bids electronically from a plurality of proposers, rank the received bids using a plurality of criteria, and electronically provide resulting information to requestors and bidders.

In contrast with the typical "forward" auction, the dimensions for selecting a winning bidder are typically not just best price, but include a variety of additional dimensions, such as the brand and quality of the merchandise proposed, the timeliness of delivery, and the quality of service. In reverse auctions, therefore, the best priced offer may not be the eventual winning bid. The requestor of goods and services may also select two or more of the top bidders with whom to enter a negotiation. Thus, the winning bidder at the completion of the auction may not be the eventual winner of the business contract.

U.S. Patent Application 2008/0120194 to Juras et al. describes a method of assisting businesses in acquiring merchant services by providing merchants at least one competitive acquirer rate through a computer program and network such as the Internet. Such method does not calculate and provide the merchant with the estimated monthly expense for its merchant processing services associated with the competitive acquirer rates provided or rank the competitive quotes based on qualitative feedback of other merchants that have used the merchant processing services of such merchant acquirers. Nor do such methods provide the merchant sales representatives with pricing models to determine the profitability of their quoted rates or change in value of their merchant account portfolio as a result of acquiring such merchant at the respective quote, or the ability to change their respective quotes in real-time in response to quoted rates from other merchant sales representatives.

Prior art systems do not provide a comprehensive online bidding and sales management system that provides merchants with an estimated monthly expense associated with its merchant processing services for each proposal from merchant sales representatives, and a ranking of such proposals based on qualitative feedback from prior merchants that have used the proposed merchant processing services. Merchants can not effectively and efficiently make a one to one comparison of bid proposals for merchant processing services in order to select the most competitive proposals for the best merchant processing services.

Prior art systems do not provide a comprehensive online bidding and sales management system that provides merchant sales representatives with the ability to calculate and analyze the profitability and savings associated with its merchant processing proposals and the value of its merchant account portfolio through various macro and micro pricing models and portfolio valuation models as well as the ability to change its proposal for merchant processing services in real-time in response to more competitive proposals and better ranking of other merchant sales representatives.

SUMMARY OF THE INVENTION

Embodiments of the invention provide a comprehensive online bidding and sales management system and method for merchant processing services. The system enables the merchant sales representative of acquirers, financial institutions, merchant processors, independent sales organizations and associations to actively submit bids to merchants for merchant processing services over the Internet through an online auction program. Merchants using the system can obtain multiple bids for merchant processing services from merchant sales representatives that are automatically ranked by the system based on the best overall price (estimated monthly expense to merchant) and a feedback weighting that is determined by the system based on sales representative feedback ratings provided by merchants using the system.

Encompassed in the comprehensive system are various features and functionalities which facilitate the online bidding and sales management of merchant processing services. The system provides an online auction program to merchants and sales representatives for merchant processing services, as well as various merchant processing pricing models, reference materials, business credit cards, working capital, equipment leasing, equipment purchasing and payroll processing.

The primary function of the system is focused on merchant processing services for credit cards and other bank cards, and encompasses setting up a merchant account to accept Visa, MasterCard, American Express, and Discover.

Utilizing the system, merchants can open up a bidding window from five to ten days, for example, all from a personal computer, thus eliminating the need for setting up face to face meetings with sales representatives to review and analyze their bid proposals.

The sales representative is able to electronically submit quotes or bid proposals to hundreds of merchants during an online bidding auction.

The system takes all the bids that a merchant may choose to receive, from 5 to 500, for example, and then automatically calculates the amount of money the merchant will spend on a monthly basis (estimated monthly expense) for its merchant processing services for each bid. The process takes into consideration approximately 17 various billing fees that a merchant is assessed by the acquiring bank or merchant processor, the type of pricing plan being offered such as interchange pass through or a bundled rate pricing method which could encompass a tiered rate pricing method, the blend of cards that are accepted for consumer cards, check cards, and rewards cards and the blend of Visa, MasterCard, Discover and American Express cards that the merchant will accept.

The system also automatically determines the qualified, partially qualified and non-qualified blend for all card types accepted by the merchant and then calculates the appropriate interchange qualification levels for each card type based on as many as 300 various permutations that might apply (e.g., card present, card not present, pin entered, etc.) to come up with one estimated monthly expense for each bid.

The system distills all bid proposals down to one estimated monthly expense that the merchant will pay the acquiring bank or merchant processor for its merchant processing services. The system provides a standardized bid proposal and thus levels the playing field between all sales representatives and provides the merchant with an accurate one-to-one comparison of estimated monthly expenses for its merchant processing services. The system removes the uncertainty and guessing inherent in conventional sales quotes as to which proposal is better and what the merchant's monthly expenses might be.

Utilizing the system, the merchant is able to view online a standardized bid proposal on all the bids that it receives from sales representatives including, for example, all fees, who provides customer service, who the merchant processor is, whether fees are settled daily or monthly, the term of the agreement, and the early termination fee. The merchant can thus view or print the standardized bid proposal and make a one to one comparison of bid proposals on pricing and services.

The system also allows the merchant to compare the level of customer and technical support being offered by the acquiring banks and merchant processors who are bidding on the merchant processing services of the merchant business. Previous merchants who have used the system provide qualitative feedback on the acquiring banks and merchant processors that they have selected as a winning bidder to provide its merchant processing services. This data is collected and used to facilitate a bid ranking process.

Based on the sales representative bidder's overall pricing and feedback score, the system will automatically determine the sales representative bidder's overall bid ranking, ranking the best to the lowest bidder for the merchant. For example, a sales representative bidder may have the best over all price; however, its overall feedback weighting based on its ratings in eight qualitative categories may be very low, therefore, the system will apply a lower bid ranking to the bidder based on its feedback weighting.

The sales representative is able to monitor its bid ranking compared to other merchant sales representatives on an open bidding summary screen, and to change its bid proposal at any time during an auction in order to improve its bid ranking. During an auction, the sales representative does not know the estimated monthly expense of other sales representative's bid proposals, but only its bid ranking in comparison to other sales representative bid proposals. The sales representative is then able to view a pending bidding summary to see if it has been selected as a top bidder by the merchant.

The system will also automatically calculate and show the merchant sales representative its estimated revenues and processing expenses, and provides various merchant processing pricing models to the sales representative including both a macro pricing model and micro pricing model, which could also be referred to as distinct acquiring processing pricing models.

The macro pricing model enables the merchant sales representative to view the various interchange categories (e.g., retail, hotel, supermarket, gas station transactions) and enter information to determine its breakeven rate to quote or bid based on the interchange categories, its monthly net revenue and the merchant's estimated monthly savings. The model is designed so that the merchant sales representative can quote a bundled rate/tiered rate or an interchange pass through pricing method.

The micro pricing model enables the merchant sales representative to generate or modify its processing expenses and quoted expenses to the merchant and then view the results in terms of monthly revenues, spreads, and merchant processor revenues. The micro pricing model also enables the sales representative to compare various pricing methods such as an interchange plus to a bundled rate, buy rate or tiered rate method or a bundled rate, buy rate, or tiered rate method with an 80% revenue share to a flat buy rate method, in many different scenarios in order to evaluate which acquiring bank or merchant processor provides the best possible economic opportunity to the sales representative. The micro pricing model allows for the percentage of revenue share to be 0 to 100 percent.

The system also provides a statement analysis model which enables the merchant sales representative to enter a merchant's current merchant processing statement and the sales representative's own pricing for each of the current billing elements. The statement analysis model will then automatically calculate the savings in dollars terms and percentages, which can then be presented to the merchant.

The system provides a portfolio valuation model which enables the merchant sales representative to determine the value of its portfolio of merchant accounts or how much it would spend to acquire a merchant portfolio from another sales representative.

The system further provides a pin debit model which provides a sales representative with a calculation of the total cost per transaction and related fees associated with various pin debit card networks based on an average ticket and monetary code selected by the sales representative. An average ticket represents the average dollar amount of each credit card transaction for a merchant.

BRIEF DESCRIPTION OF THE DRAWINGS

For the invention to be clearly understood and readily practiced, the invention will be described in conjunction with the following figures, wherein like reference characters designate the same or similar elements, which figures are incorporated into and constitute a part of the specification, wherein:

FIGS. 2A and 2B illustrate an example merchant registration form;

Figure 3A:
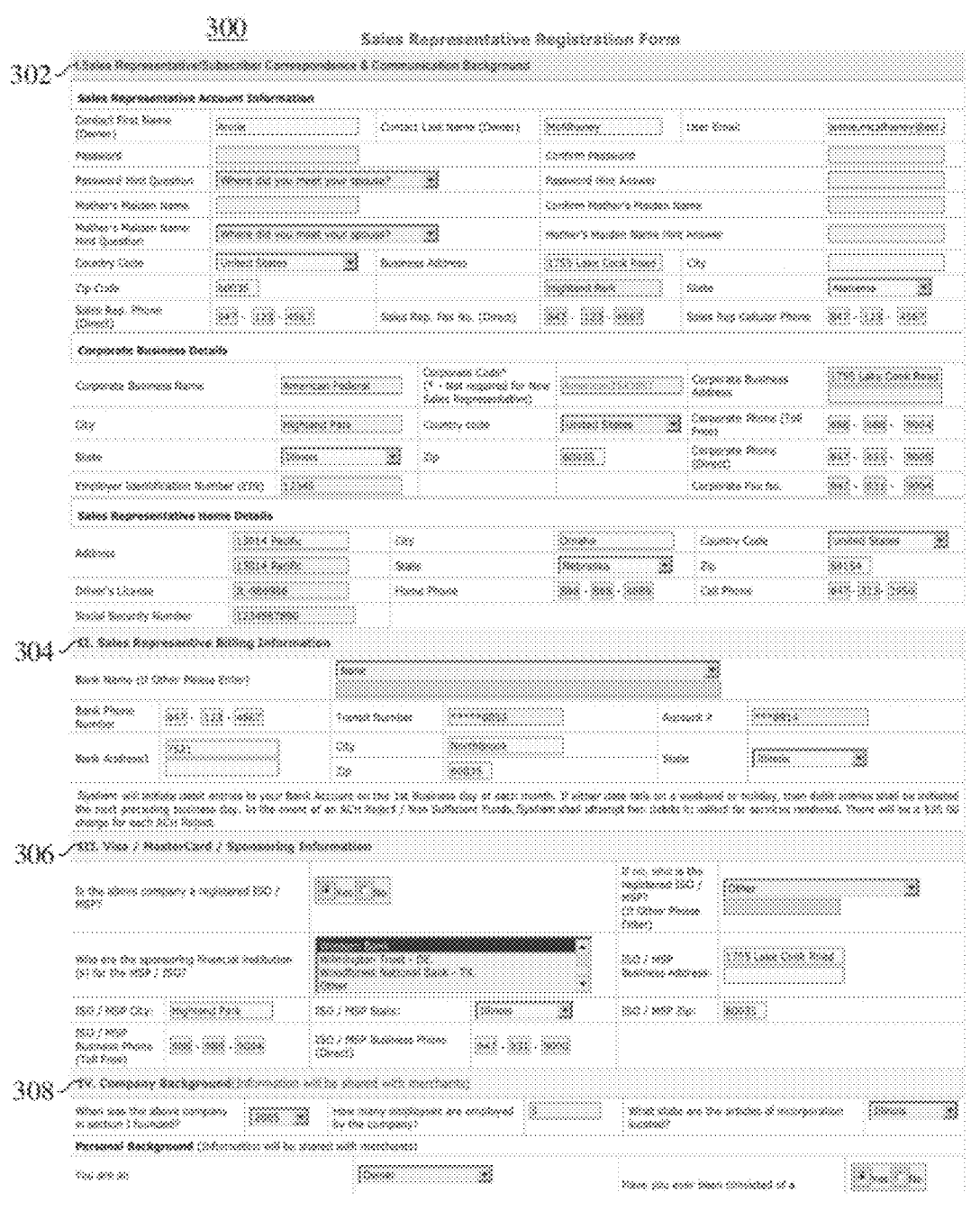
Figure 3B:
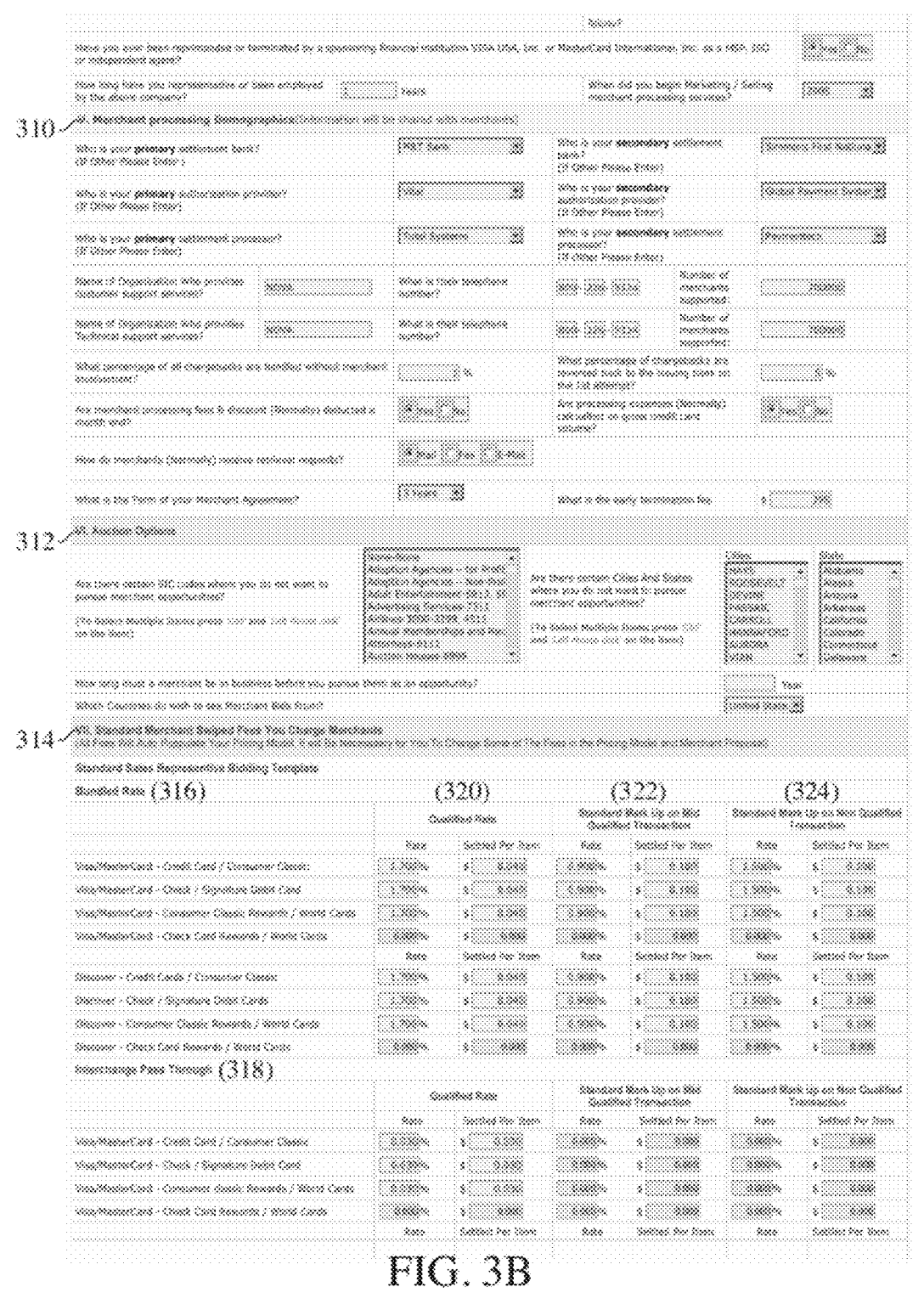
Figure 3C:
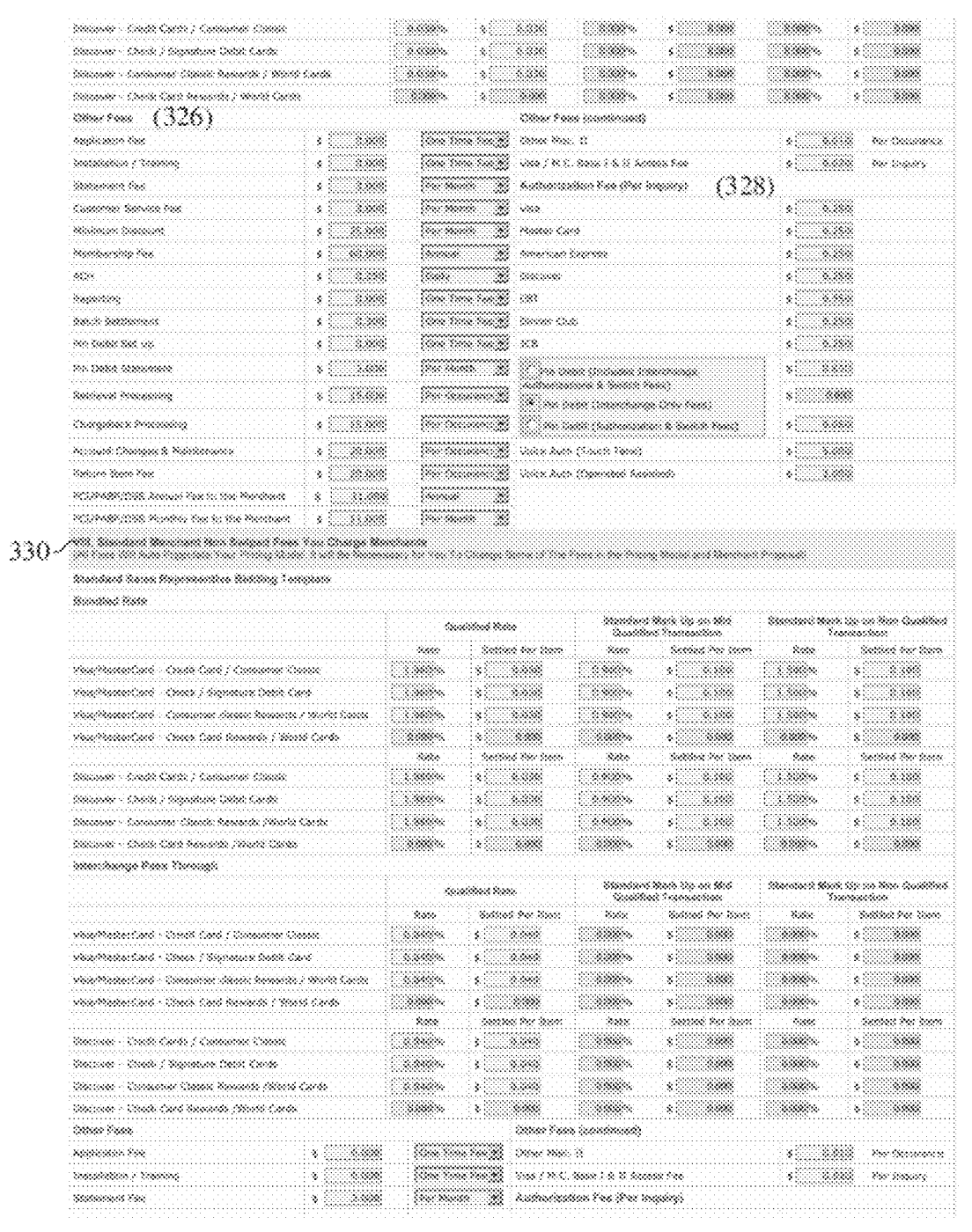
Figure 3D:
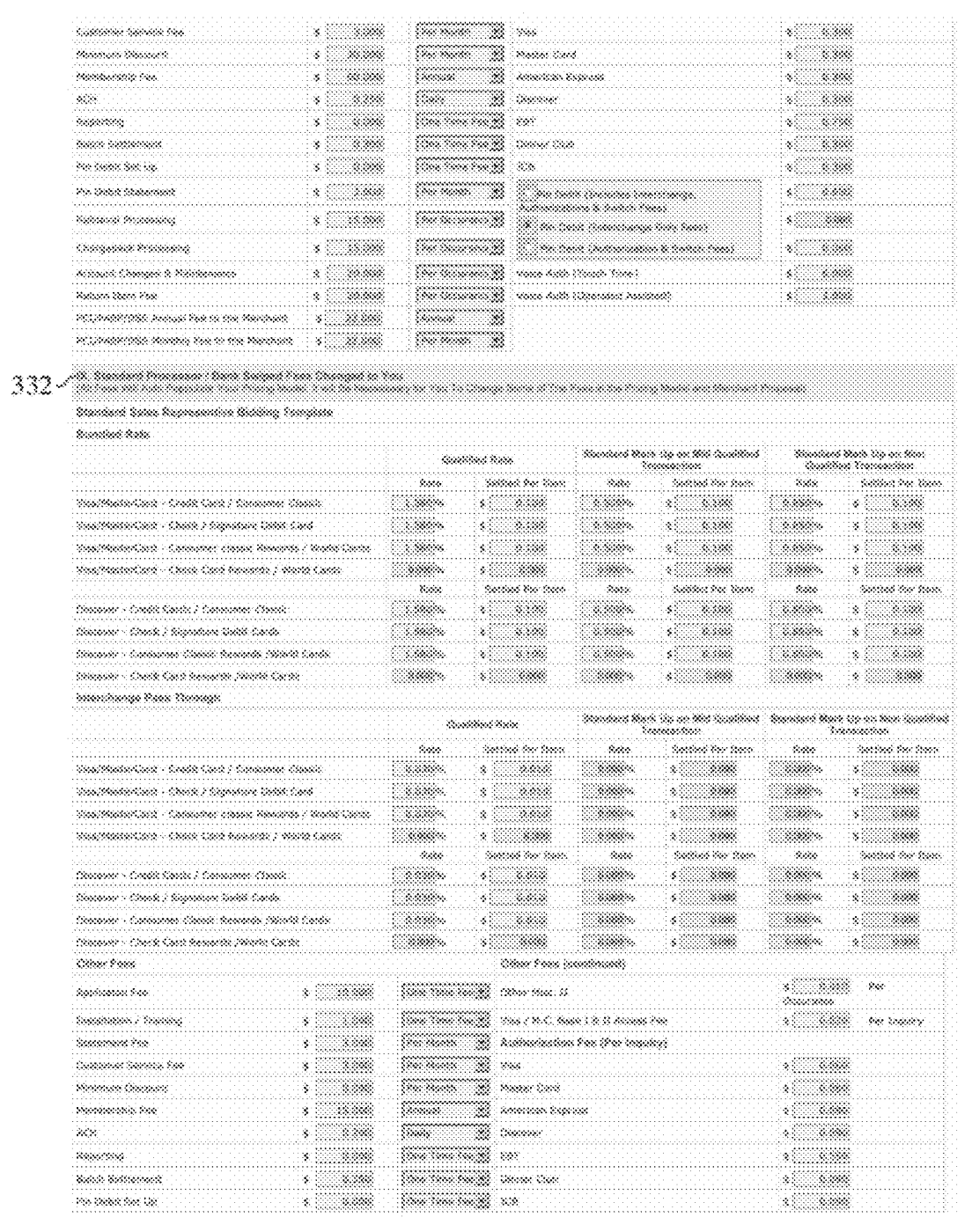
Figure 3E:
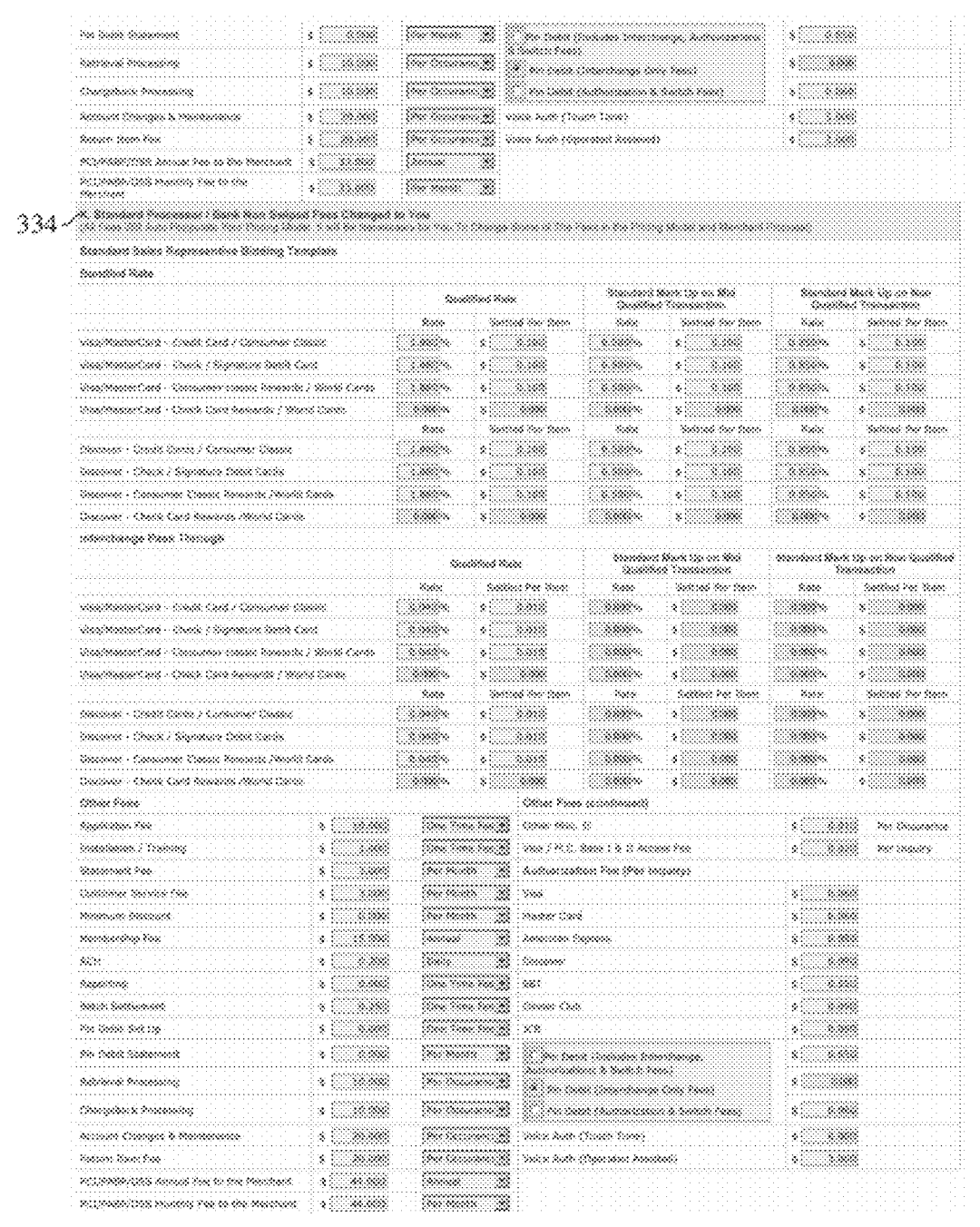
Figure 3F:
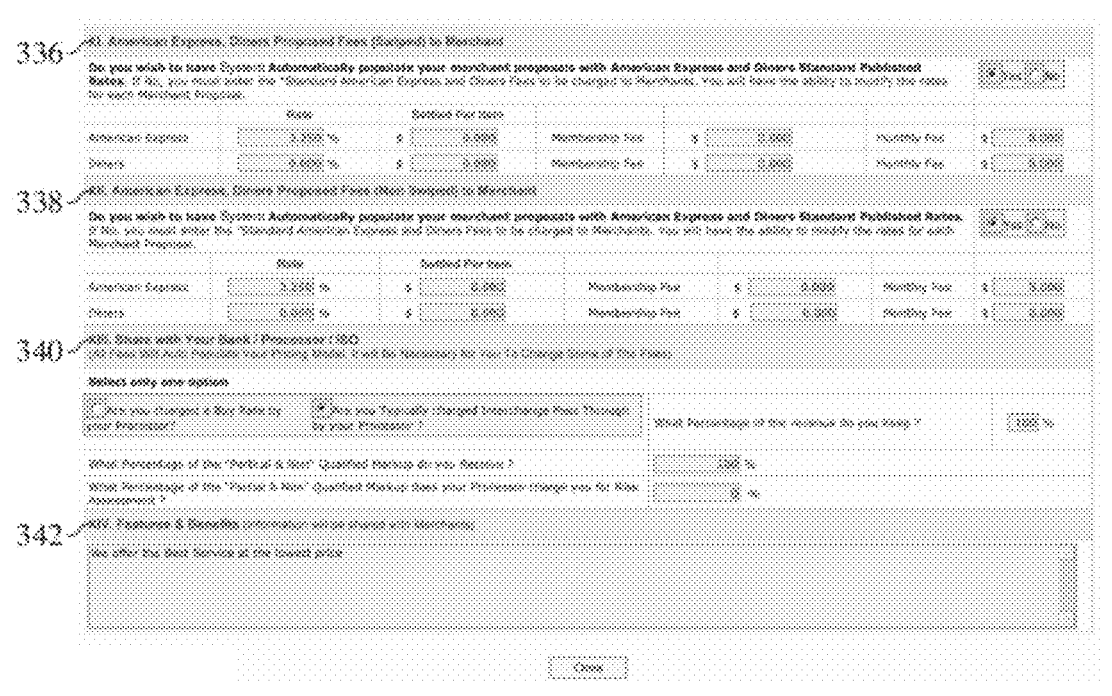

FIGS. 3A to 3f illustrate an example sales representative registration form;

FIGS. 4A to 4C illustrate an example of a standardized bid proposal generated by the system;

FIG. 6 illustrates an exemplary bid ranking calculation;

FIGS. 7A and 7B illustrate an example of a macro pricing model;

Figure 8A:
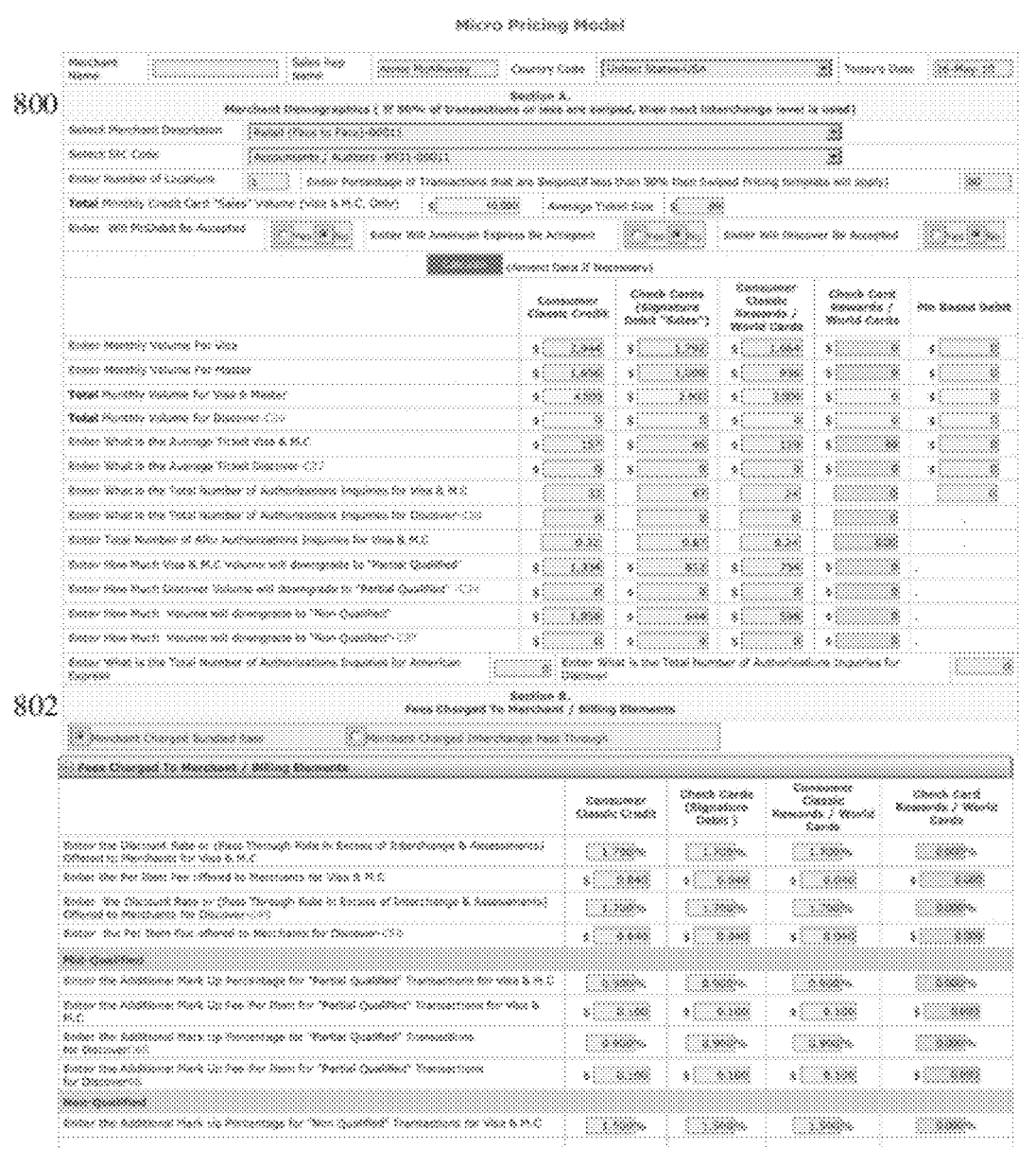
Figure 8B:
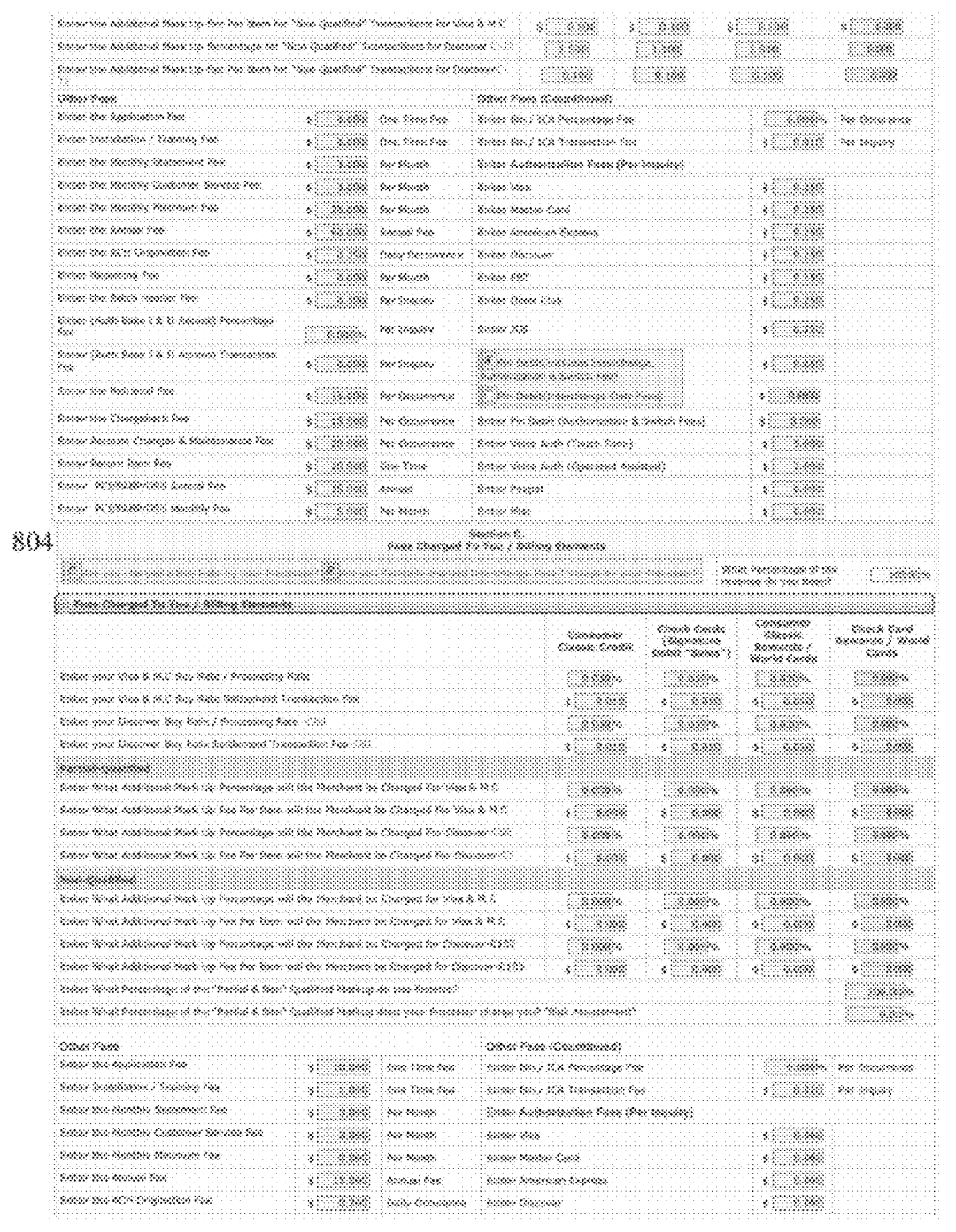
Figure 8C:
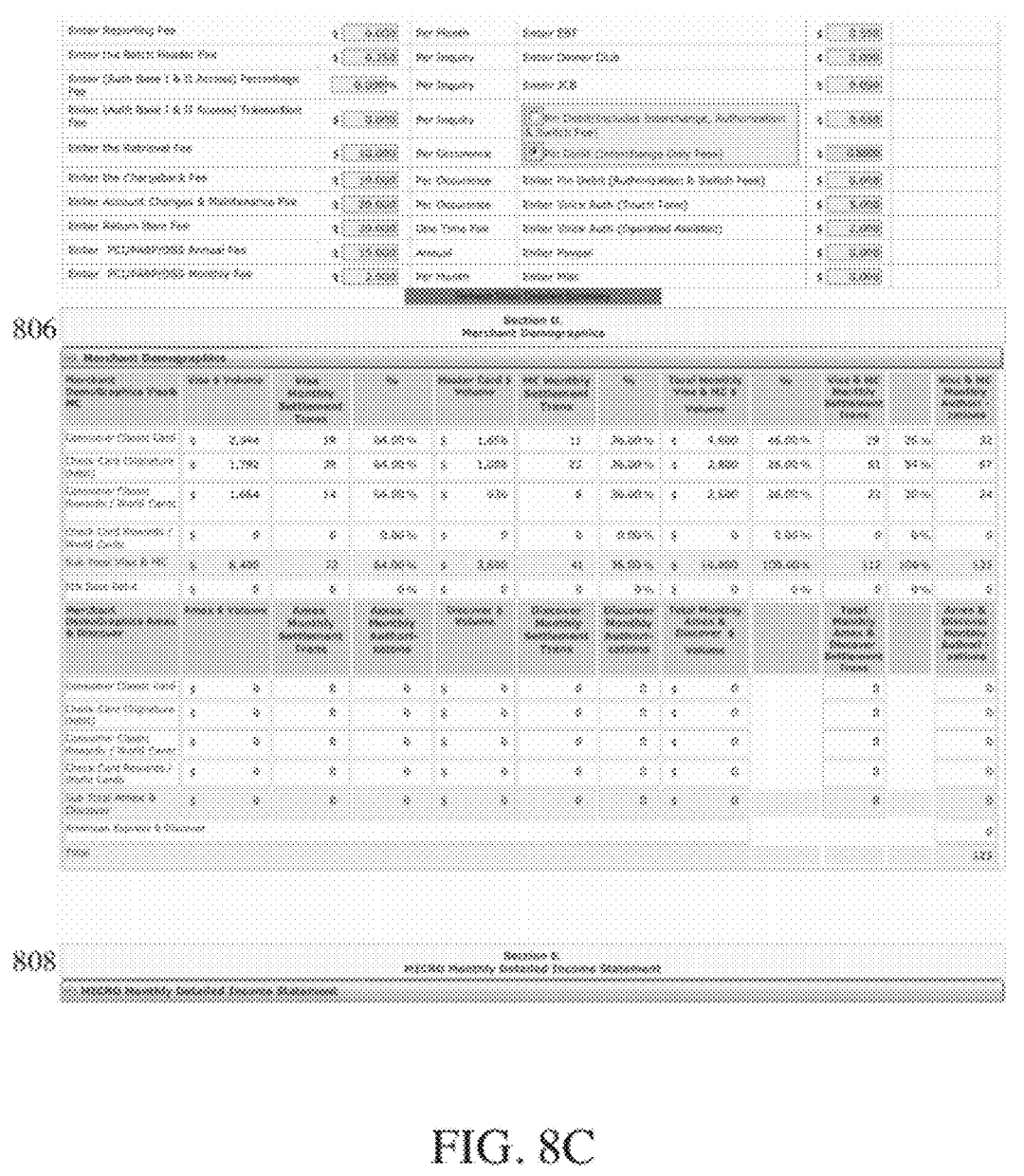
Figure 8D:
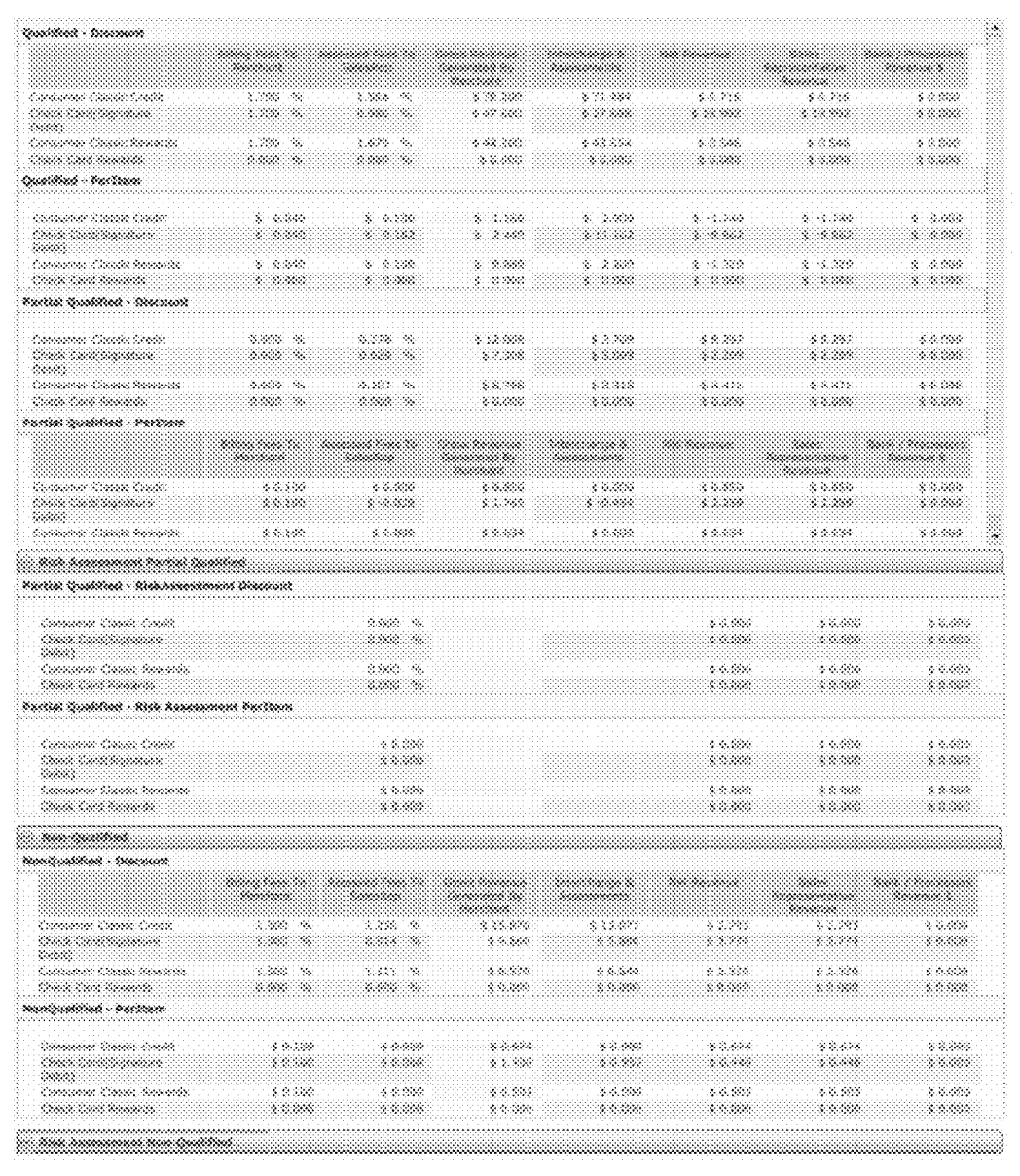
Figure 8E:
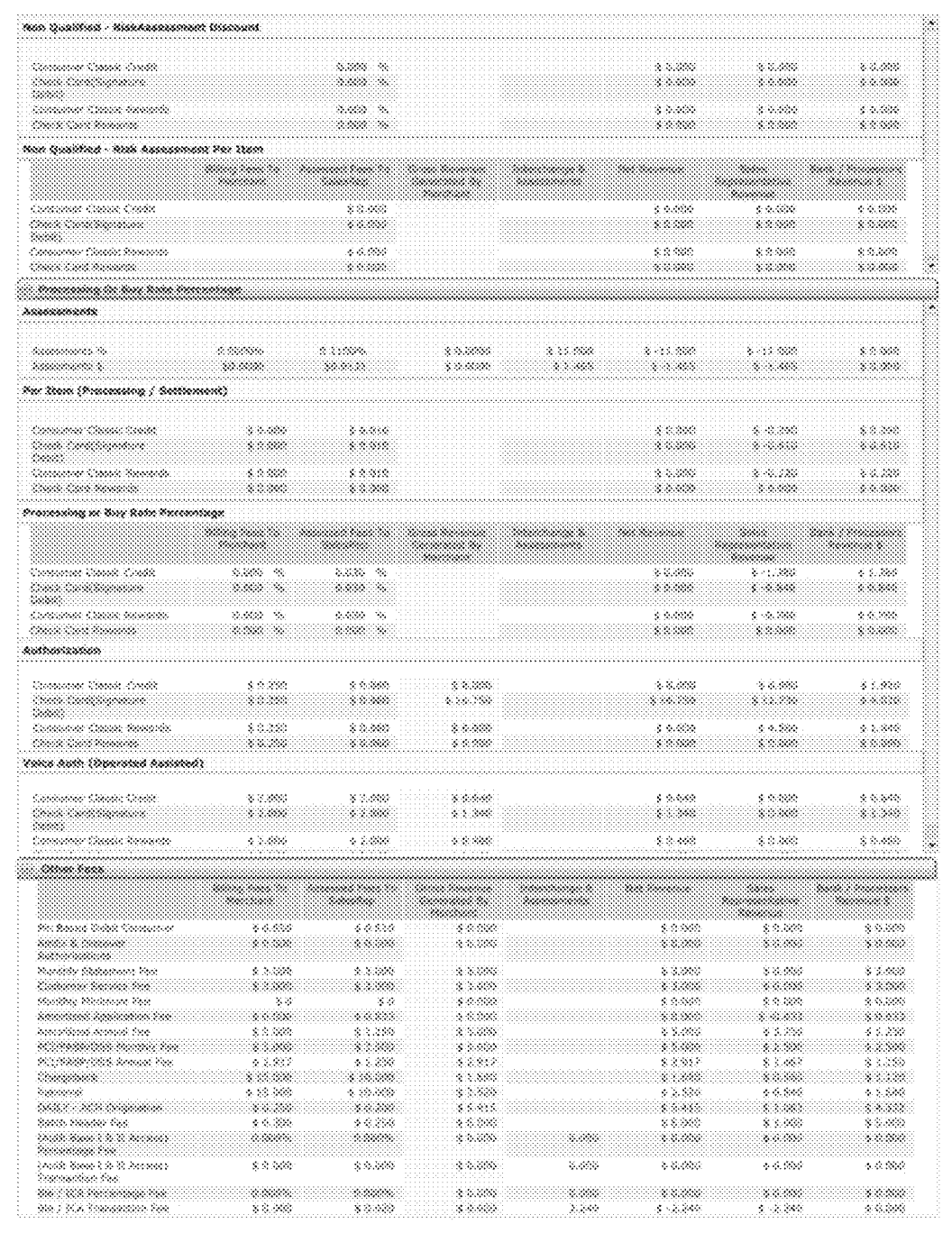
Figure 8F:
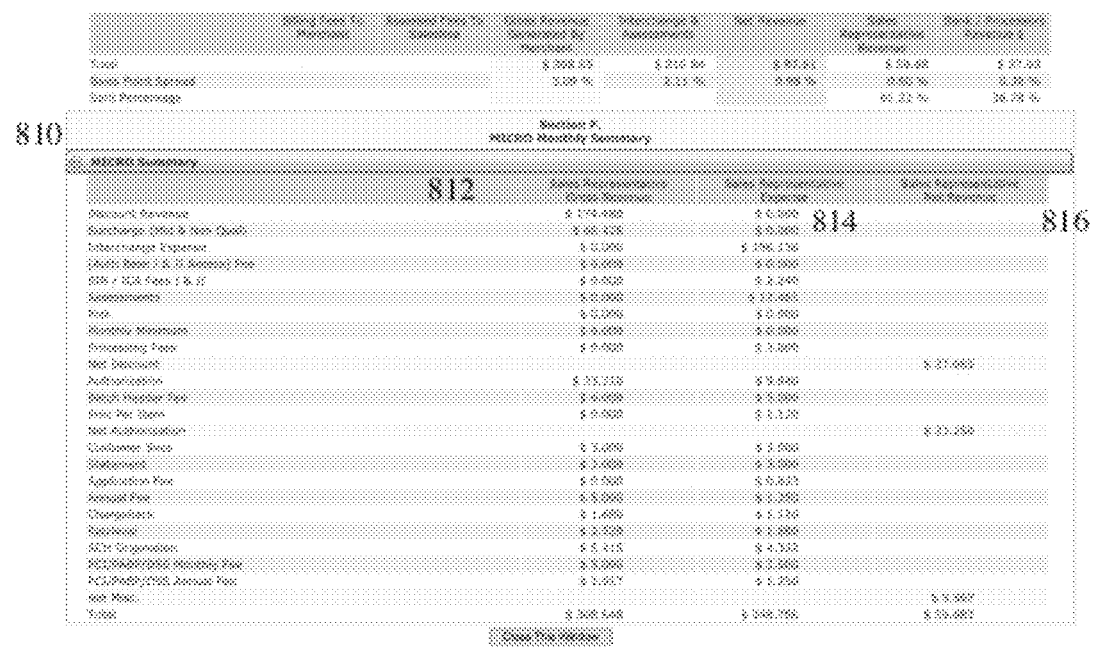

FIGS. 8A to 8f illustrate an example of a micro pricing model;

FIG. 11 illustrates an example of a PIN debit model.

DETAILED DESCRIPTION OF THE INVENTION

It is to be understood that the figures and descriptions of the invention have been simplified to illustrate elements that are relevant for a clear understanding of the invention, while eliminating, for purposes of clarity, other elements that may be well known. Those of ordinary skill in the art will recognize that other elements are desirable and/or required in order to implement the invention. However, because such elements are well known in the art, and because they do not facilitate a better understanding of the invention, a discussion of such elements is not provided herein. The detailed description will be provided herein below with reference to the attached drawings.

Figure 1:
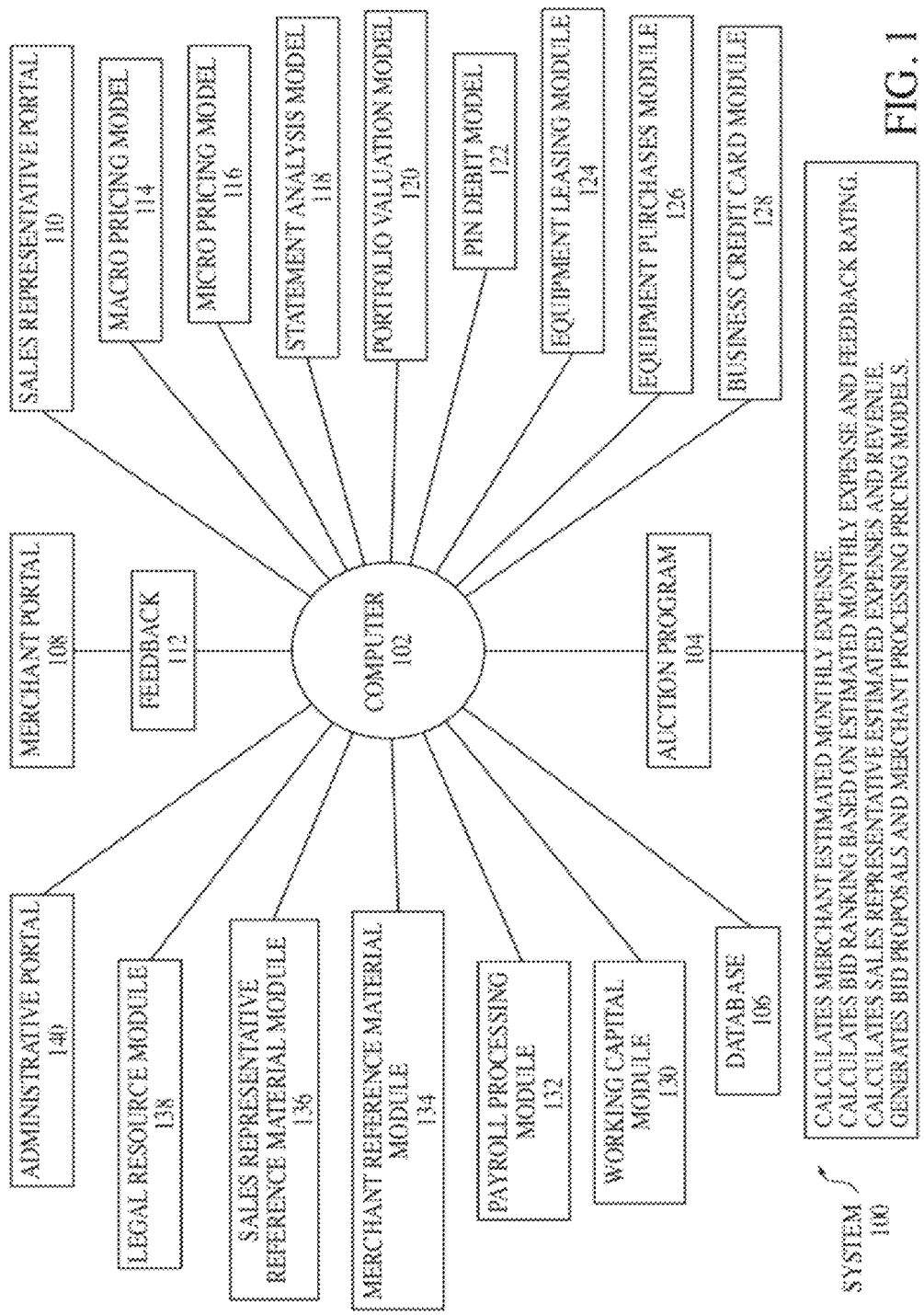
FIG. 1 is a block diagram illustrating the components of the comprehensive online bidding and sales management system according to principles of the invention.

Referring to FIG. 1, the system 100 includes a computer 102 connected to an electronic network such as the Internet and at least one merchant computer (not shown) and at least one sales representative computer (not shown) via the electronic network. In a preferred embodiment, the system 100 is maintained at a web site available on the Internet through a server that may be accessed by various users including merchants and sales representatives. Each merchant or sales representative may use their own personal computer connected to the Internet and accessible to the system 100 through conventional web browsing software. The merchant and sales representative computers are non-limiting and could include any computer-based device or Internet-enabled device capable of accessing the Internet such as desktop computers, laptop computers, personal digital assistants (PDAs) and cell phones.

System 100 has computer 102 as its central hub, and computer 102 can be any type of computer system or web server capable of running or operating the system 100 web site according to methods well known in the art. Typically, a web site is hosted on a computer system known as a web server or HTTP server and includes the program, software, and databases to operate the web site and retrieve and deliver web pages in response to requests from web site users, and to process and store data that may be input by the users and shown on the web pages. The computer 102 includes an auction program 104 and at least one database 106 for storing data. The auction program 104 encompasses the source code and/or software that permits the computer 102 to operate and implement the features and functions of the system 100.

At the system 100 website, the merchant and sales representative are presented with a series of screens, tabs, drop-down menus, and links as commonly known to guide them through the various components and functions provided by the system 100 through conventional mouse clicks and typing of entries into open fields where applicable.

The block diagram of FIG. 1 shows the various components of a preferred embodiment of the system 100, including, but not limited to the following components as will be discussed in greater detail below: a merchant portal 108, sales representative portal 110, feedback 112, macro pricing model 114, micro pricing model 116, statement analysis model 118, portfolio valuation model 120, pin debit model 122, equipment leasing module 124, equipment purchases module 126, business credit card module 128, working capital module 130, payroll processing module 132, merchant reference material module 134, sales representative reference material module 136, legal resource module 138, and administrative portal 140.

Merchant Portal

To utilize the merchant portal 108, a merchant creates a merchant registration or profile by creating a username and password and completing a merchant registration form. This can be accomplished, for example, via a new merchant link on the system 100 web site. Once registered, merchants can login, access and utilize the features and functions available through the merchant portal 108.

During merchant registration, the merchant enters information about its business necessary to create and submit a bid request via the auction program 104 of system 100 and for the system 100 to generate and process any bid proposal submitted in response to the bid request.

Another reason for the information is to provide the sales representatives with sufficient details to provide an accurate and competitive bid proposal. The merchant information is stored in the system database 106 and none of the potential bidders receive merchant identifying information such as business name, phone number or contact information of the merchant until the merchant selects the top bidders, which could typically be the top five to ten sales representative bid proposals.

Figure 2A:
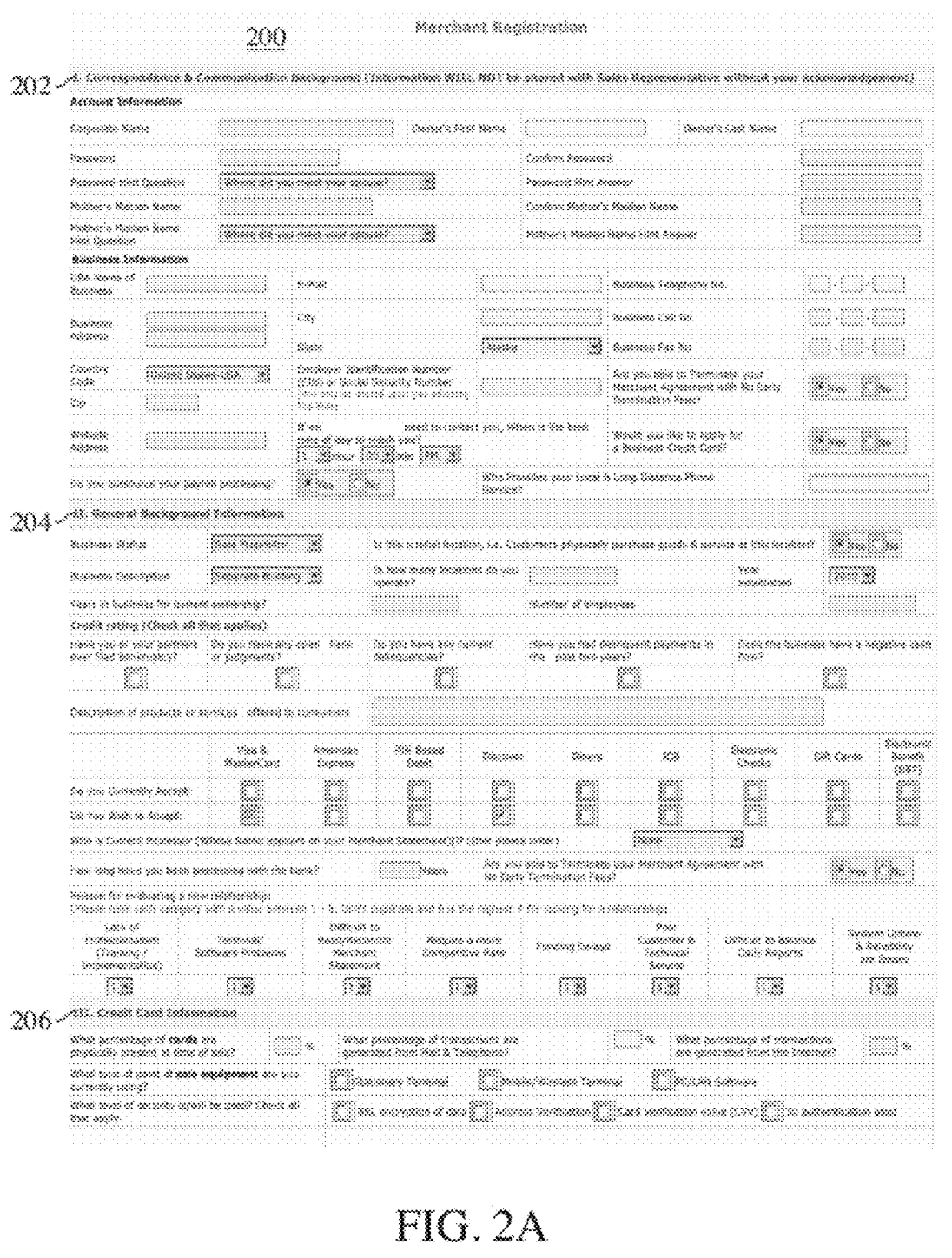
Figure 2B:
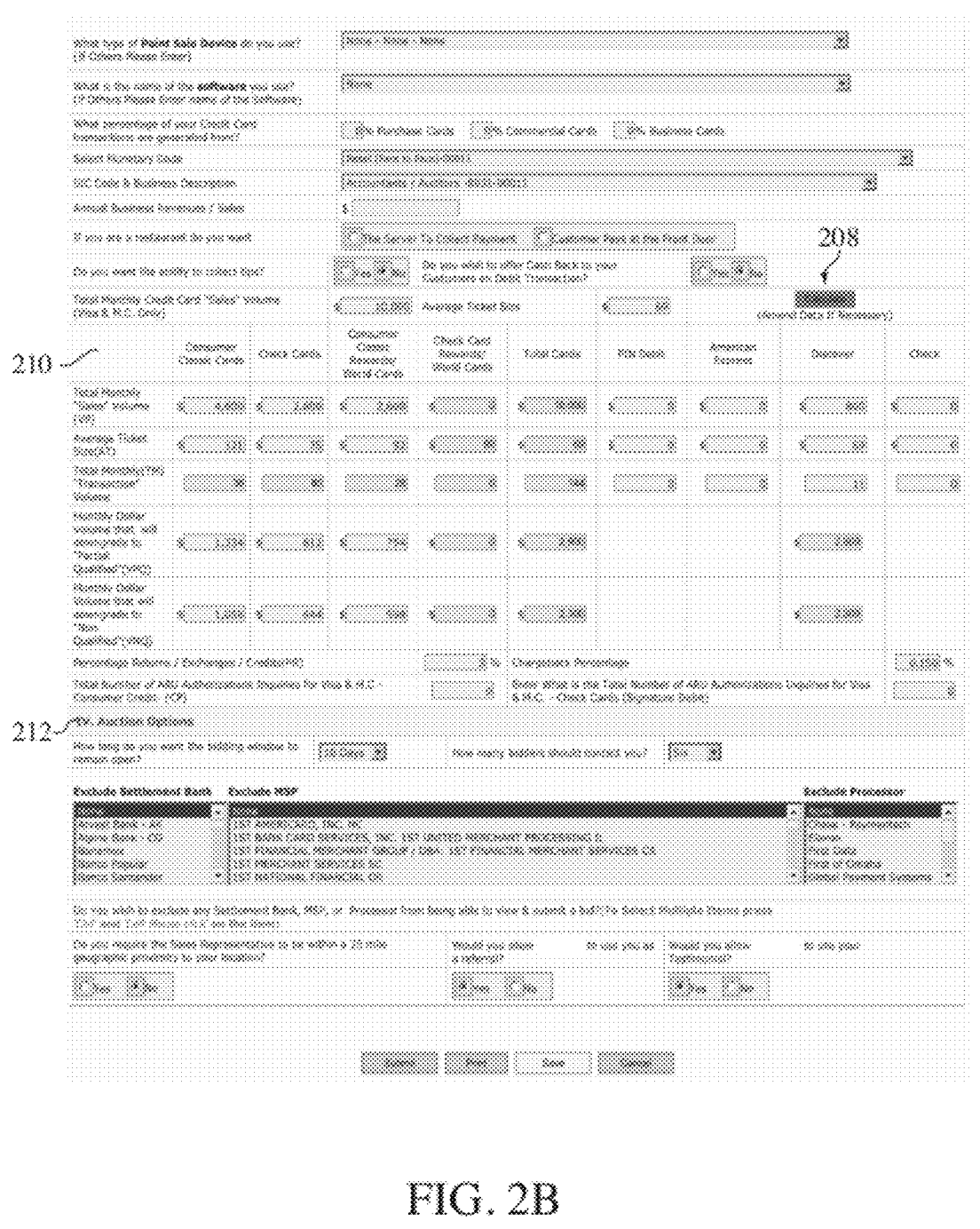

FIGS. 2A and 2B illustrate an exemplary merchant registration 200 and the information requested by the auction program 104 regarding the merchant. The information collected includes correspondence and communication background information 202. This is general information regarding the merchant's login password and business information such as the business name, owner, and business contact information. Also provided is general background information 204 such as the type and description of the merchant business, credit rating, type of credit cards the merchant business currently accepts or would like to accept, current merchant processor if applicable, and the reasons for seeking a new merchant processor relationship.

With respect to the reasons for seeking a new merchant processor relationship in general background 204, the merchant is able to rank or assign a value or weight to various qualitative categories of potential significance to the merchant. In a preferred embodiment, this may include (1) lack or professionalism (training/implementation), (2) terminal and software problems, (3) difficult to read and reconcile merchant statement, (4) require a more competitive rate, (5) funding delays, (6) poor customer and technical service, (7) difficult to balance daily reports, and (8) system uptime and reliability are issues.

The merchant registration 200 also includes credit card information 206 with respect to the merchant business. This includes the percentage of cards present at the time of sale, such as, swiped bank card transactions, versus transactions generated by mail, phone or the internet, such as, non-swiped bank card transactions; the type of point of sale equipment and software utilized by the business; the percentage of credit card transactions generated from purchase cards, commercial cards, and business cards; the monetary code and SIC code and description of the merchant business; annual business revenues, total monthly credit card sales volume, and average ticket size.

As shown in FIGS. 2A and 2B, once the credit card information 206 is entered, the merchant can click on a calculate tab 208, and the system 100 will then calculate various merchant credit card data 210 including the total monthly sales volume, average ticket size, total monthly transaction volume, monthly dollar volume that will be downgraded to partially qualified, monthly dollar volume that will be downgraded to non-qualified, the percentage of returns, exchanges and credits, the chargeback percentage, and total number of voice authorizations or auto response unit (ARU) authorizations. The merchant also has the ability to modify or change any of the automated fields that are populated by the system to further refine the parameters.

Through merchant registration 200, the merchant is also able set preferred auction options 212 such as how long the bidding window should remain open, the number of sales representative bidders the merchant would like to be contacted by following the auction, whether an particular settlement bank, MSP, or merchant processor should be excluded from the auction, and any geographical location requirements for its sales representative.

The completed registration 200 provides the data necessary to initiate an auction and request bid proposals for such business. The merchant also has the option to create new company or business profiles on which to receive bid proposals by clicking on a link and providing the same registration information for other companies or businesses of the merchant.

Referring back to the merchant portal 108 of FIG. 1, once registered and logged in, the merchant has access to the merchant portal 108 homepage and the various features and functions of the system 100 including the auction program 104 and other merchant account processing products such as merchant reference material 134, and the business credit card module 128, working capital module 130, and payroll processing module 132. Merchants can also review various features of the system 100 such as sample proposals, sample auctions, and merchant registration, and refer others to the system 100 web site.

Utilizing the auction program 104 available through the merchant portal 108, the merchant can initiate an auction by submitting a request for bid proposals. The merchant can also view active bid proposals received from sales representatives including open bid proposals, pending bid proposals and winning bid proposals, discontinue or delete an auction, and view and award bid proposals based on the estimated monthly expenses and bid ranking of each bid proposal determined by the system 100.

During an auction, the merchant has the option to view the details of each bid proposal, select one or more top bidders or a winning bidder, discontinue the bid request or allow the auction to continue so as to receive additional bid proposals from other sales representatives, or to allow the sales representatives that have already submitted bid proposals to modify and improve their bid proposals in consideration of the other bid proposals including the current bid ranking and estimated monthly expenses of such bid proposals.

During an auction, the merchant will typically select the top five to ten bidders, resulting in the release of the merchant's business name, owner's name, phone number and contact information to the selected top sales representative bidders so that they can contact the merchant to answer any additional questions from the merchant regarding their merchant processing services. The merchant will also have the ability to view the contact information of each top sales representative bidder selected.

In a preferred embodiment, approximately thirty days from selecting the top five or more bidders, the system 100 will send an email to the merchant requesting confirmation of the winning bidder selected to provide its merchant processing services. The system 100 will also request that the merchant complete and submit feedback 112 regarding the winning bidder selected, which will then be utilized by the system 100 in ranking bidders during subsequent auctions and assist other merchants in evaluating bidders and their bid proposals. The merchant can login and select a link to submit feedback 112 on the sales representative of the winning bid proposal.

In a preferred embodiment, merchants are requested to provide feedback 112 on eight qualitative categories including (1) professional sales representative (2) easy to use terminal/software, (3) easy to read/reconcile monthly merchant statement, (4) offered competitive rate with no hidden fees, (5) receive daily deposits in a timely manner, (6) customer and technical support, (7) able to balance daily deposits and reporting, and (8) implementation and training. The merchant is able to select a subjective value of 1 through 8 to each qualitative category based on the merchant's experience in utilizing merchant processing services of the particular sales representative whose bidding proposal was selected as the winner.

The system 100 will automatically determine a bid ranking of each bid proposal submitted by sales representatives based on the estimated monthly expense of the bid proposal calculated by the system 100 and an overall feedback weighting calculated by the system 100 from feedback 112 provided by merchants.

Sales Representative

To utilize the sales representative portal 110, the sales representative creates a sales representative registration or profile from the system 100 website by creating a username and password and completing a sales representative registration form.

FIGS. 3A to 3F illustrate an example sales representative registration 300 and the information collected regarding the sales representative and its business. The information collected includes the sales representative's correspondence and communication information 302, including information regarding the sales representative's login password and business details such as the business name, sales representative name, and contact information. Also provided is the sales representative's billing information 304 for which the system 100 can use to electronically debt fees associated with the sales representative's subscription and use of the system 100.

The sales representative registration 300 further includes Visa, MasterCard and sponsoring information 306 of the sales representative business and whether the business is a registered ISO or MSP, as well as general company background 308 about the business and individual sales representative. The sales representative then provides its merchant processing demographics 310 which includes identification of its primary and secondary settlement bank, authorization provider, settlement processor, and the organization that will provide the customer and technical support services to the merchant. Also included in the merchant processing demographics 310 is information regarding the percentage of chargebacks handled without merchant involvement and those reversed back to the issuing bank and early termination fee. The sales representative is also able to set preferred auction options 312 such as any SIC codes or locations that it would like to exclude as potential merchant opportunities.

The next part of the sales representative registration 300 collects detailed information regarding the standard rates and fees charged by the sales representative to merchants for merchant processing services. This detailed information is used by the system 100 to automatically generate bid proposals and to automatically populate and generate the various merchant processing pricing models available to the sales representative.

In a preferred embodiment, the various fees and rates are categorized by whether the credit card transaction is a swiped or non-swiped transaction through a point of sale terminal or software, and whether a bundled rate or interchange pass through pricing method is used. For each category, the various rates and per item fees for each type of bank card and each interchange qualification level of qualified, partially qualified (mid-qualified) or non-qualified transaction is provided. A third category for other fees is also provided.

As shown in FIGS. 3A to 3F, the detailed rates and fees entered into the sales representative registration 300 include the standard merchant swiped fees charged to the merchant 314. Under this category of fees, is shown various rates and fees for the categories of bundled rate 316 and interchange pass through rate 318. For each type of credit card, the rate and per item fee is provided as a qualified rate 320, standard mark up on a partially qualified transaction 322, and standard mark up on a non-qualified transaction 324. Then, any other applicable other fees 326 and applicable authorization fees 328 are provided.

The same type of rates and fees of the sales representative are provided with respect to its standard merchant non-swiped fees charged to the merchant 3330 and the standard processor/swiped fees charged to the sales representative 332 and standard processor/non-swiped fees charged to the sales representative 334.

The sales representative registration 300 also provides the option to utilize standard published rates and fees charged to merchants for certain credit card transactions such as American Express and Diners, or permits the sales representative to enter proposed fees for such transactions. On sales representative registration 300 this is shown as 336 and 338.

Also provided on the sales representative registration 300 is information regarding the sales representative's share with its bank, merchant processor, or ISO 340. Here, the sales representative selects whether it is charged a buy rate or interchange pass through by its merchant processor, and enters the percentage of the partially qualified and non-qualified mark up the sales representative receives and the percentage charged the sales representative by the merchant processor for risk assessment. The sales representative designates the amount of revenue that it will retain. The sales representative may also enter text relating to any features and benefits 342 it provides that it would like to share with the merchants to which it submits a bid proposal.

The completed sales representative registration provides the data necessary to submit bid proposals during an auction and to utilize the various merchant processing pricing models available to the sales representative as set forth in greater detail below, which are automatically generated by the system 100 based on the information provided during registration.

Referring back to FIG. 1, once registered and logged in, the sales representative has access to the sales representative portal 110 homepage and the various features and functions of the system 100 including the auction program 104 and other system 100 components such as the macro pricing model 114, micro pricing model 116, statement analysis model 118, portfolio valuation model 120, pin debit model 122, equipment leasing module 124, equipment purchases module 126, working capital module 130, business credit cards module 128, and sales representative reference material module 136. Sales representatives can also view various features of the system such as sample bid proposals, sample auctions, and a sample sales representative registration.

Utilizing the auction program 104 available through the sales representative portal 110, the sales representative can view an open bidding summary. This summary lists bid requests submitted by merchants for merchant processing services that are open for bidding. The merchant sales representative can select any number of bid requests from merchants for which to submit a bid Proposal. The system 100 will automatically generate the bid proposal based on the sales representative registration information and the registration information provided by the merchant. During an auction, the sales representative can view submitted bids proposals, pending bids proposals, and winning bid proposals, submit and delete bid proposals, and review and modify existing bid proposals.

The merchant sales representative is able to change its bid while the auction is open in an effort to improve the estimated monthly expense to the merchant based on its bid, and overall bid ranking based in part on such estimated monthly expense.

The sales representative has access to all of the various merchant processing pricing models for which to analyze and manage its bid proposals as well as its overall merchant processing services business, including the macro pricing model 114, micro pricing model 116, statement analysis model 118, portfolio valuation model 120, and pin debit model 122.

Each of the models can be used by the sales representative to analyze bid proposals during an auction or can be used by the sales representative independent of the auction program 104 to analyze conventional bid proposals and lead opportunities and to manage its business of selling merchant processing services.

Through the sales representative portal 110, the sales representative can also view pricing plans for use of the system 100, detailed billing summaries from its use of the system 100, and the sales representative's average feedback rating from merchants that have submitted feedback 112. The sales representative can also refer a friend to the system 100 web site such as other merchants or sales representatives, view testimonials, and submit, terminate, or upgrade it contractual agreement for use of the system 100.

On a monthly basis, the system 100 will debit the sales representative account for usage of the system 100 based on the number of merchant accounts established using the auction program 104. Sales representatives can be charged in any number or variety of ways, including an initial set up fee, followed by a flat monthly or annual fee, and a sliding scale fee for each merchant that is signed up for merchant processing services using the system 100. At month end the system 100 will provide summary and detail reporting to the sales representative reflecting the monthly debit that will be initiated by the system 100 to the sales representative's financial institution indicated on the sales representative registration.

Figure 4A:
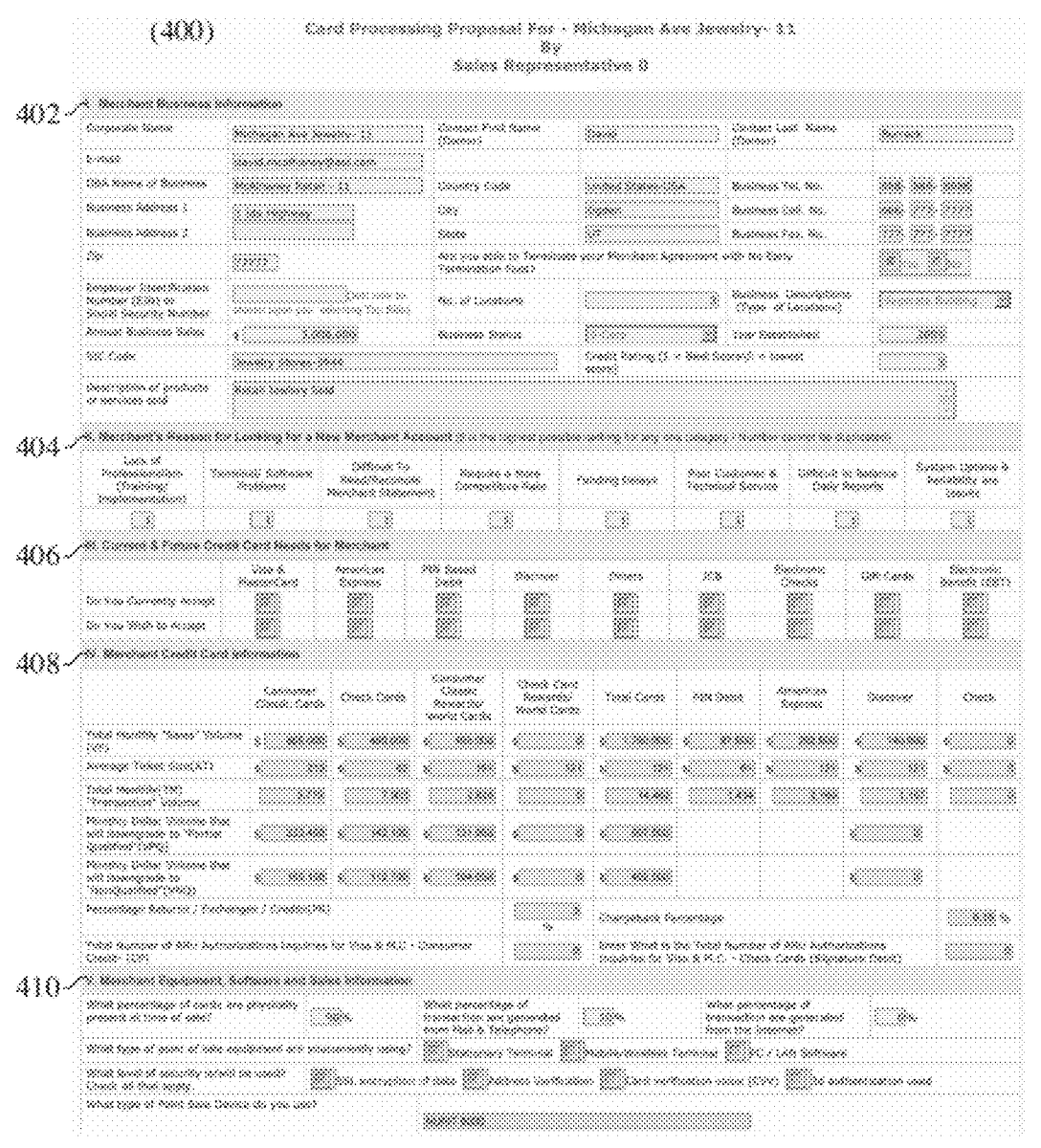
Figure 4B:
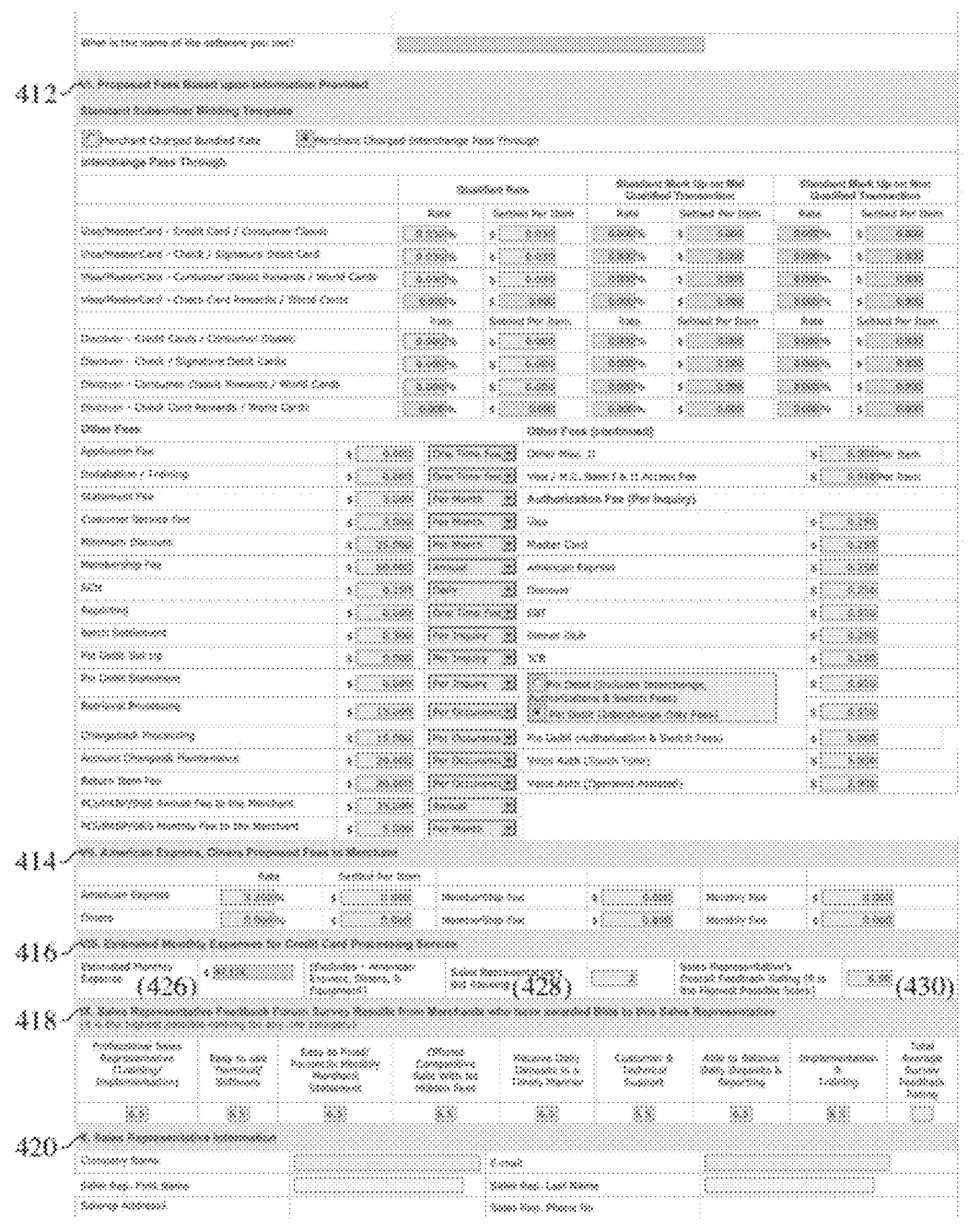
Figure 4C:
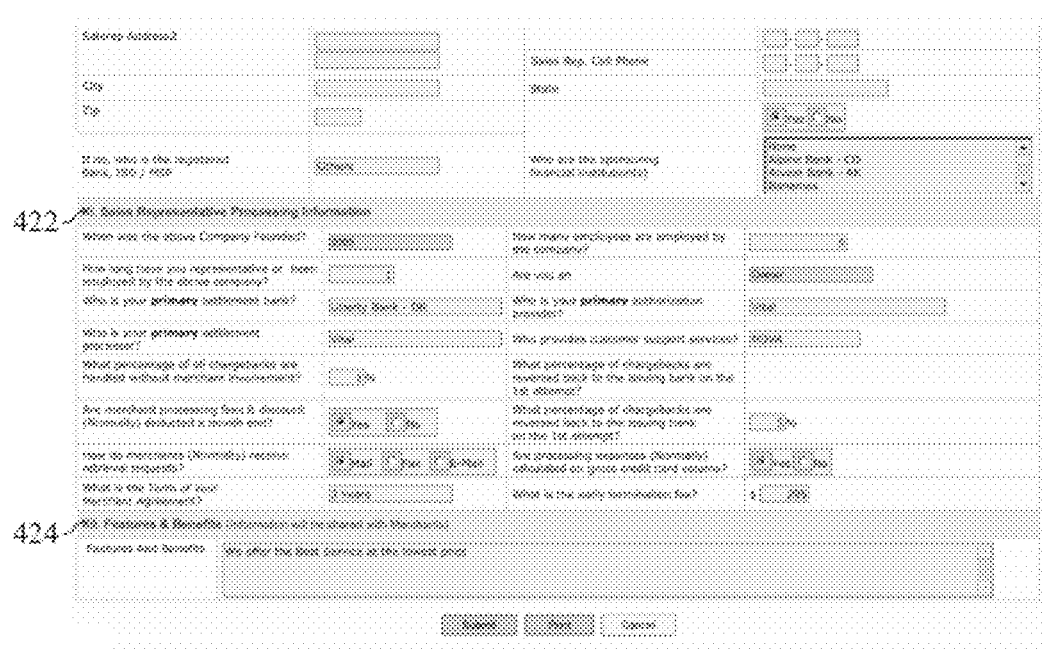

FIGS. 4A to 4C illustrate an example of a standardized bid proposal 400 that is submitted by a sales representative to a merchant that has submitted a bid request for its merchant processing services. When a sales representative clicks on a link to create and submit a bid proposal to a particular merchant request for bid, the standardized bid proposal 400 is automatically generated and populated with data from the merchant registration regarding its business and the sales representative registration regarding its various transaction fees and mark up for submission to the merchant. The quoted fees on the standardized bid proposal 400 can also be modified or updated by the sales representative prior to submitting the bid proposal, or anytime after the bid proposal is submitted while the auction is still open.

From the merchant registration, the bid proposal 400 includes the merchant's business information 402 and reason for looking for a new merchant account 404, the current and future credit card needs for the merchant 406, merchant credit card information 408, and merchant equipment, software, and sales information 410. From the sales representative registration, the bid proposal 400 includes proposed fees based upon information provided by the sales representative 412 under a bundled rate method or interchange pass through method selected by the sales representative, American Express and Diners proposed fees to the merchant 414, estimated monthly expenses for bank card processing service 416, sales representative feedback forum survey results from merchants who have awarded bids to the sales representative 418, sales representative name and contact information 420, sales representative processing information 422, and any features and benefits 424 of that sales representative. As shown in bid proposal 400, the sales representative's name and contact information 420 is not provided to the merchant in the initial bid proposal. In a corresponding manner, the merchant's name and contact information 402 is not provided to the sales representative viewing the initial bid proposal.

At the time the bid proposal is submitted, the system 100 automatically calculates an estimated monthly expense 426 for the merchant associated with the bid proposal and automatically determines the bid ranking 428 for the bid proposal based on the estimated monthly expense and overall feedback rating 430 for the sales representative that submitted the bid proposal.

Figure 5A:
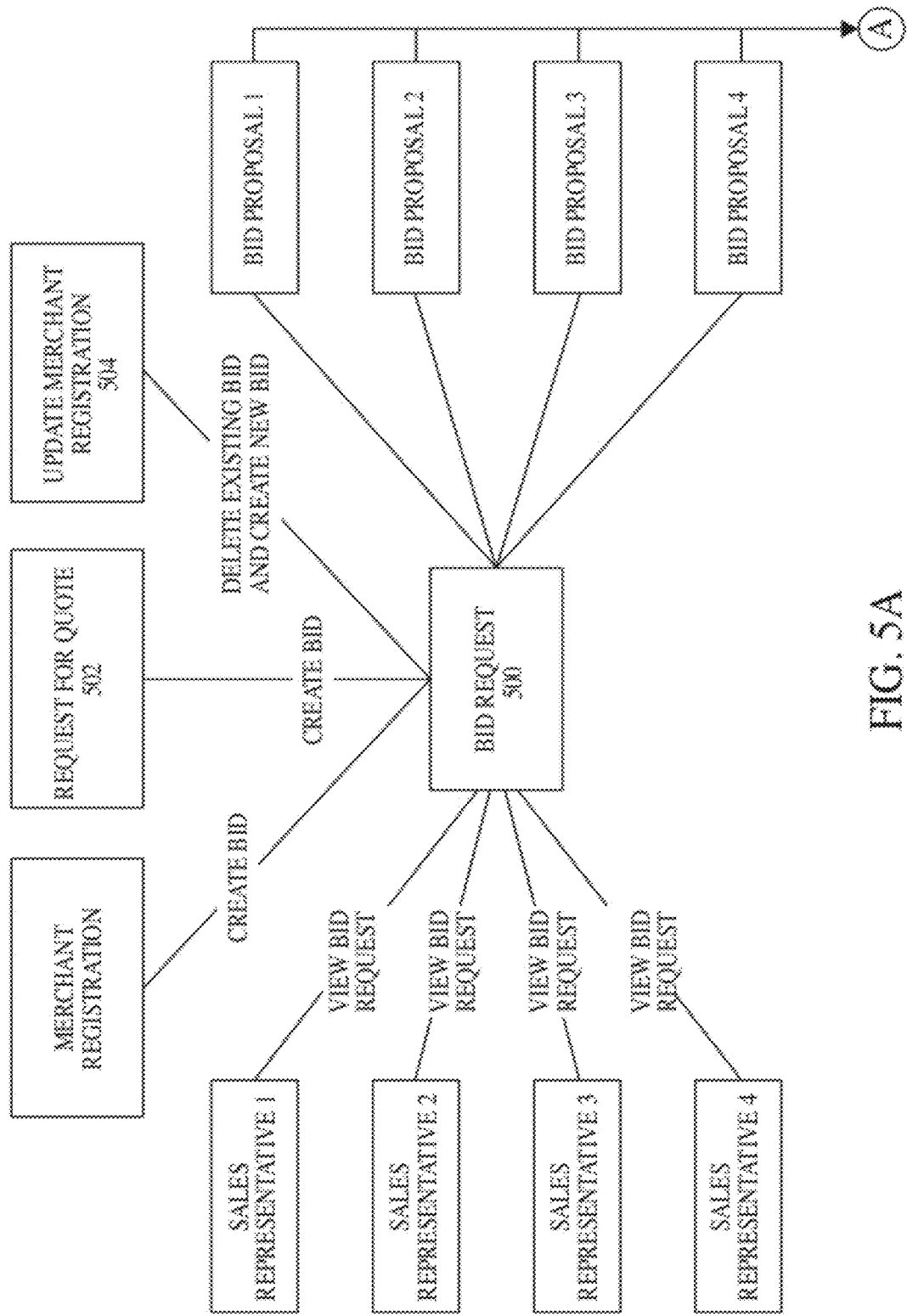
FIGS. 5A and 5B illustrate a flow chart depicting an exemplary auction and the interplay between a merchant bid request and various bid proposals from sales representatives.
Figure 5B:
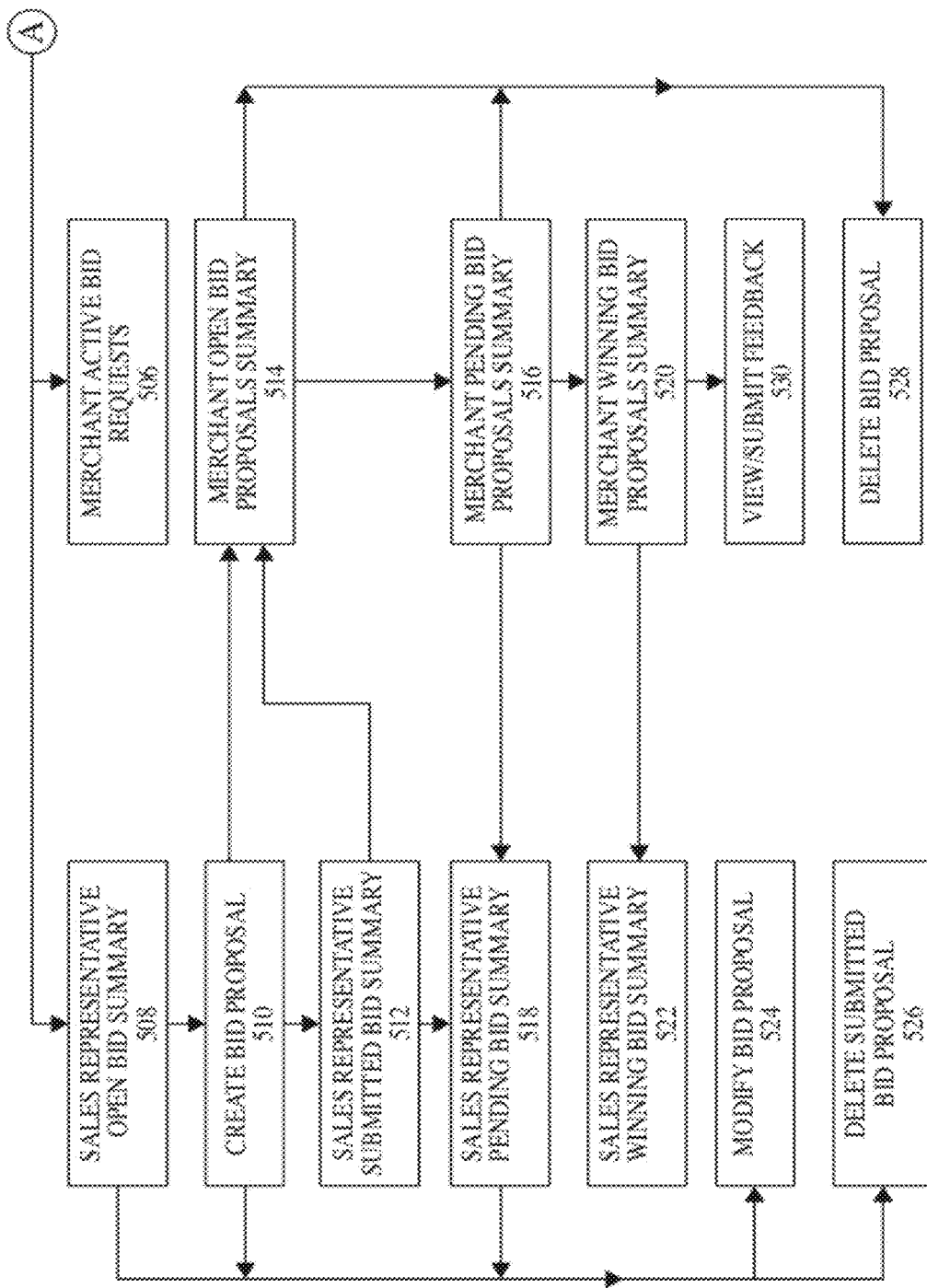

Referring to FIGS. 5A and 5B illustrates a flow chart depicting an exemplary auction and the interplay between a merchant bid request and various bid proposals from sales representatives.

In a preferred embodiment of the exemplary auction, the merchant initiates the auction by creating a bid request 500 and submitting it through the system 100 as a request for quote 502. The bid request 500 is automatically generated and populated by the system 100 based on information provided in the merchant registration. The merchant can also update its merchant registration 504 and create a new bid request based on the updated information or delete an existing bid request.

Once submitted, the bid request 500 becomes an active bid request 506 for the merchant and it appears in the sales representative's open bid summary 508. The sales representative can then view the bid request 500 and create a standardized bid proposal 510. The bid proposal is automatically generated and populated by the system 100 with the necessary information based on the merchant registration and sales representative registration, however, the sales representative may also modify any of its information in the bid proposal 524 prior to submitting the bid proposal. The merchant's name and contact information is not provided to the sales representative in the bid request 500 or open bid summary 508 at this step.

The sales representative's open bid summary 508 also provides the sales representative with summary information including the date the bid request was requested from the merchant and the date the bid request closes, the number of bids received by the merchant thus far in response to the bid request, the merchant's city, state, and country, the total credit card monthly sales volume and transaction volume for the merchant, the average ticket for the merchant and a description of the products or services sold by the merchant.

Once the bid proposal is submitted, the system 100 automatically calculates the estimated monthly expense to the merchant, the bid ranking, and the monthly net revenue to the sales representative based on the bid proposal. The bid proposal then appears in the sales representative's submitted bid summary 512 and the merchant's open bid proposals summary 514.

In the sales representative's submitted bid summary 512, the sales representative can see its bid ranking and monthly net revenue associated with its bid proposal along with the other summary information provided in the open bid summary 508. The sales representative can also utilize the macro pricing model, micro pricing model and statement analysis model associated with its bid proposal, view the bid proposal including the estimated monthly expense to the merchant, modify and update its bid proposal 524, or delete its submitted bid proposal 526 from the submitted bid summary 512.

In the merchant open bid proposals summary 514, the merchant is able to select and view the bid proposals including its estimated monthly expense and the bid ranking of each bid proposal received. From the merchant's open bid proposal summary 514, the merchant is able to review all of the bid proposals received in response to its bid request 500 including the estimated monthly expense and bid ranking associated with each bid proposal, and then select one or more bid proposals 510 as top bid proposals.

The merchant open bids proposal summary 514 also provides the merchant with other summary information including the date the bid request was requested and the date the bid request closes, whether the bid proposal is for a bundled or interchange pass through method, the qualified discount rate for a consumer card transaction, the qualified per item fee for a consumer card transaction, the authorization fee for a consumer card transaction, the qualified discount rate for a check card, the qualified per item fee for a check card, the authorization fee for a check card, the total credit card sales volume, and the city, state and country of the sales representative. In addition, the merchant can click on a link to view the survey feedback rating of the sales representative of any particular bid proposal from the merchant open bids proposal summary 514. The merchant can also delete bid proposals 528 from the open bids proposal summary 514.

Once one or more top bid proposals are selected, such bid proposals appear in the merchant's pending bid proposals summary 516, where the merchant can review the bid proposals including its estimated monthly expense and the bid ranking of each bid proposal. The pending bid proposals summary 516 provides the merchant with the same summary information provided in its open bid proposals summary 514 but also now includes the sales representative's name and contact information.

The respective bid proposals also appear in the pending bid summary 518 of each sales representative whose bid proposal was selected as a top bid proposal. The sales representative is able to review the bid proposal 510 including the estimated monthly expense to the merchant and its bid ranking as well the macro pricing model, micro pricing model and statement analysis model associated with its bid proposal. The merchant's name and contact information is also provided to the sales representative in the pending bid summary 518. The sales representative can then contact the merchant to discuss the bid proposal and/or modify and update its bid proposal 524 or delete its bid proposal 526 from the pending bid summary 518.

Any updated bid proposals submitted by the sales representative, including any newly calculated estimated monthly expenses and bid ranking resulting from updated bid proposals will be reflected in the merchant's pending bid proposals summary 516.

From the merchant's pending bid proposals summary 516, the merchant can select the winning bid proposal or discontinue the bid request. If selected as a winning bid proposal, the bid proposal appears in the merchant's winning bid proposals summary 520, and the winning bid summary 522 of the sales representative whose bid proposal was selected as the winner. Both the merchant and the sales representative are able to review the winning bid proposal including the estimated monthly expense and bid ranking of such bid proposal, and the sales representative is also able to review its macro pricing model, micro pricing model and statement analysis model associated with its winning bid proposal. The merchant and sales representative are also provided with one another's name and contact information.

Once the winning bid is selected, the merchant is able to submit feedback 530 on the sales representative, shown on FIG. 1 as 112.

Estimated Monthly Expense

The system 100 computes the estimated monthly expense for merchant processing service based on merchant bid request data and sales representative bid proposal data.

The estimated monthly expense to the merchant is the sum of a discount expense, surcharge expense, assessment, monthly minimum, monthly authorization, pin debit fee, monthly batch fee, customer service fee, statement fee, application fee, membership fee, chargeback fee, retrieval fee, monthly ACH fee, monthly PCI fee and a PCI annual fee. Determination of each of these fees is described below.

Discount Expense. The discount expense may be determined based on the bundled method/tiered method or the interchange pass through method. The sales representative determines which pricing method they wish to use in its bid proposal.

Discount Expense—Bundled Method/Tiered Method. Under the bundled method/tiered method, the discount expense is equal to the qualified discount expense by percent plus qualified discount expense per settled item.

Qualified Discount Expense by Percent. The qualified discount expense by percent ("QDEP") is determined as follows:

QDEP equals the sum of monthly card type volume multiplied by the rate, where:

monthly card type volume equals the monthly volume of transactions in dollars for a particular credit card type such as Discover, MasterCard and Visa and for particular card type categories such as consumer, signature debit and classic rewards; and rate equals the percent that the merchant sales representative charges for each transaction by each credit card type. If the merchant does not supply estimates of the monthly volume for each credit card type used at the merchant's business, the system 100 will assume 64% of the monthly card type volume is Visa and 36% is MasterCard and it will also add 8% to the volume if the user indicates that Discover is to be used.

The monthly card type volumes may be obtained from a table based on region of origin and monetary code. The system takes all SIC codes and groups them into 32 monetary code types (e.g. retail face-to-face, mail order, car rental). For each monetary code type, the system has tables of established percentages for volume of each card type (e.g., Visa, MasterCard and Discover), card type category (e.g., consumer, signature debit, and classic rewards), and interchange level (e.g., qualified, partially qualified, and non qualified).

The system then applies a charge type code for each card type to assess the most appropriate interchange category. In the United States, for example, there are over 300 different interchange categories for Visa, MasterCard and Discover. For each monetary code type, the system of the preferred embodiment assigns 27 charge code types to determine fees for each card type of Visa, MasterCard and Discover (e.g., qualified Visa consumer, partially qualified consumer, non qualified Visa consumer) and each charge type code has a corresponding interchange value for percentage and per item fees. The system considers the region of origin (e.g., United States, Asia Pacific, Canada, Europe, Central and Eastern Europe, and Latin America) in assessing the interchange values.

Qualified Discount Expense per Settled Item, The qualified discount expense per settled item ("QDESI") is determined as follows:

QDESI equals the sum of the monthly card type transactions multiplied by the per item charge, where:

monthly card type transactions equals the number of monthly transactions for each credit card type such as Discover, MasterCard and Visa and for particular card type categories such as consumer, signature debit and classic rewards and further divided as to qualified, partially qualified or non-qualified; and per item charge equals the amount in dollars (cents) the merchant sales representative charges for each transaction of that type.

Discount Expense—Interchange Pass Through Method. Under the interchange pass through method, the discount expense is equal to the sum of each monthly card type volume (as defined above) and further divided as to qualified, partially qualified (mid-qualified) and non-qualified multiplied by the interchange pass through rate, where:

interchange pass through rate equals the percent that the merchant sales representative charges for each transaction type such as qualified, partially qualified or non-qualified.

Surcharge Expense. The surcharge expense is equal to the interchange surcharge plus the per item surcharge.

Interchange Surcharge

The interchange surcharge is equal to the sum of monthly card type volume (as defined above) and further divided as to partially qualified or non-qualified multiplied by the mark-up rate, where:

mark-up rate equals the percent that the merchant sales representative charges for each transaction type such as partially qualified or non-qualified.

If the merchant does not supply estimates of the monthly volume for each credit card type used at the merchant's business, the system 100 will assume 64% of the monthly card type volume is Visa and 36% is MasterCard and will also add 8% to the volume if the merchant indicates that Discover is to be used.

Per Item Surcharge. The per item surcharge is equal to the per item partially qualified surcharge plus the per item non-qualified surcharge.

Per Item Partially Qualified Surcharge The per item partially qualified surcharge is equal to the per item partially qualified total transactions for each card type multiplied by the per item partially qualified surcharge fee, where:

The per item partially qualified total transactions is the partially qualified monthly card type volume divided by the average price for that type transaction.

Per Item Non-Qualified Surcharge. The per item non-qualified surcharge is equal to the per item non-qualified total transactions for each card type multiplied by the per item non-qualified surcharge fee, where:

the per item non-qualified total transactions is non-qualified monthly card type volume divided by the average price for that type transaction.

Assessment. The assessment is equal to the pass through assessment plus the per item assessment.

Pass Through Assessment. The pass through assessment is equal to the qualified monthly card type volume multiplied by the qualified assessment rate plus the partially qualified monthly card type volume multiplied by the partially qualified assessment rate plus the non-qualified monthly card type volume multiplied by the non-qualified assessment rate.

Per Item Assessment. The per item assessment is equal to the sum of the qualified per item assessment, the partially qualified per item assessment and the non-qualified per item assessment, where:

The qualified per item assessment is equal to the total qualified monthly card type transactions multiplied by the qualified assessment fee for each such transaction. the total qualified monthly card type transactions is equal to the qualified monthly card type volume divided by the average dollar amount of such transactions.

The partially qualified per item assessment is equal to the total partially qualified monthly card type transactions multiplied by the partially qualified assessment fee for each such transaction. The total partially qualified monthly card type transactions is equal to the partially qualified monthly card type volume divided by the average dollar amount of such transactions.

The non-qualified per item assessment is equal to the total non-qualified monthly card type transactions multiplied by the non-qualified assessment fee for each such transaction. The total non-qualified monthly card type transactions is equal to the non-qualified monthly card type volume divided by the average dollar amount of such transactions.

Monthly Minimum. The system 100 compares the monthly minimum fee quoted by the sales representative to the discount expense otherwise due. If the quoted monthly minimum is higher than the discount expense, the monthly minimum fee is the quoted monthly minimum less the discount expense.

Monthly Authorization. The monthly authorization is calculated the same as the per item assessment (above) except that total monthly card type volume transactions is multiplied by 1.10 and the cost per authorization is used instead of assessment fee.

PIN Debit Fee. The PIN debit fee equals the qualified PIN debit fee.

The qualified PIN debit fee is equal to the total qualified monthly card type transactions multiplied by the qualified PIN debit fee per transaction. The total qualified monthly card type transactions is equal to the qualified monthly card type volume divided by the average dollar amount of such transactions multiplied by the percent increase in authorizations over settled items.

Monthly Batch Fee. The monthly batch fee equals the number of batches submitted per day, week or month multiplied by the fee per batch. This calculation assumes there are 35 settled items per batch.

Customer Service Fee. The customer service fee equals the number of merchant locations multiplied by the monthly fee per location.

Statement Fee. The statement fee equals the number of merchant locations multiplied by the monthly fee per location.

Application Fee. The application Fee equals the application fee divided by 12.

Membership Fee. The membership fee equals the annual membership fee divided by 12.

Chargeback Fee. The chargeback fee equals the number of settled transactions per month multiplied by the chargeback percentage multiplied by the chargeback fee per chargeback. The chargeback percentage is the assumed percentage of chargebacks per month.

Retrieval Fee. The retrieval fee equals the number of settled transactions per month multiplied by the retrieval percentage multiplied by the retrieval fee per retrieval. The retrieval percentage is the assumed percentage of retrievals per month.

Monthly ACH Fee. The monthly ACH (Automated Clearing House) fee equals the number of merchant locations multiplied by the daily ACH Fee multiplied by 20.

Monthly PCI Fee. The monthly PCI fee equals the number of merchant locations multiplied by the PCI fee.

PCI Annual Fee. The PCI annual fee equals the PCI annual fee divided by 12.

Bid Ranking.

The system 100 determines and applies a bid ranking number to each bid proposal submitted by a sales representative for each respective merchant bid request.

The system 100 first calculates the estimated monthly expense for all sales representatives that submitted a bid proposal. The system 100 then takes the lowest estimated monthly expense submitted by all sales representatives and divides that number by the lowest estimated monthly expense submitted of each particular sales representative and assigns a weighting to all sales representatives based on their estimated monthly expenses. This value provided is the monthly estimated expense weighting.

Figure 6:
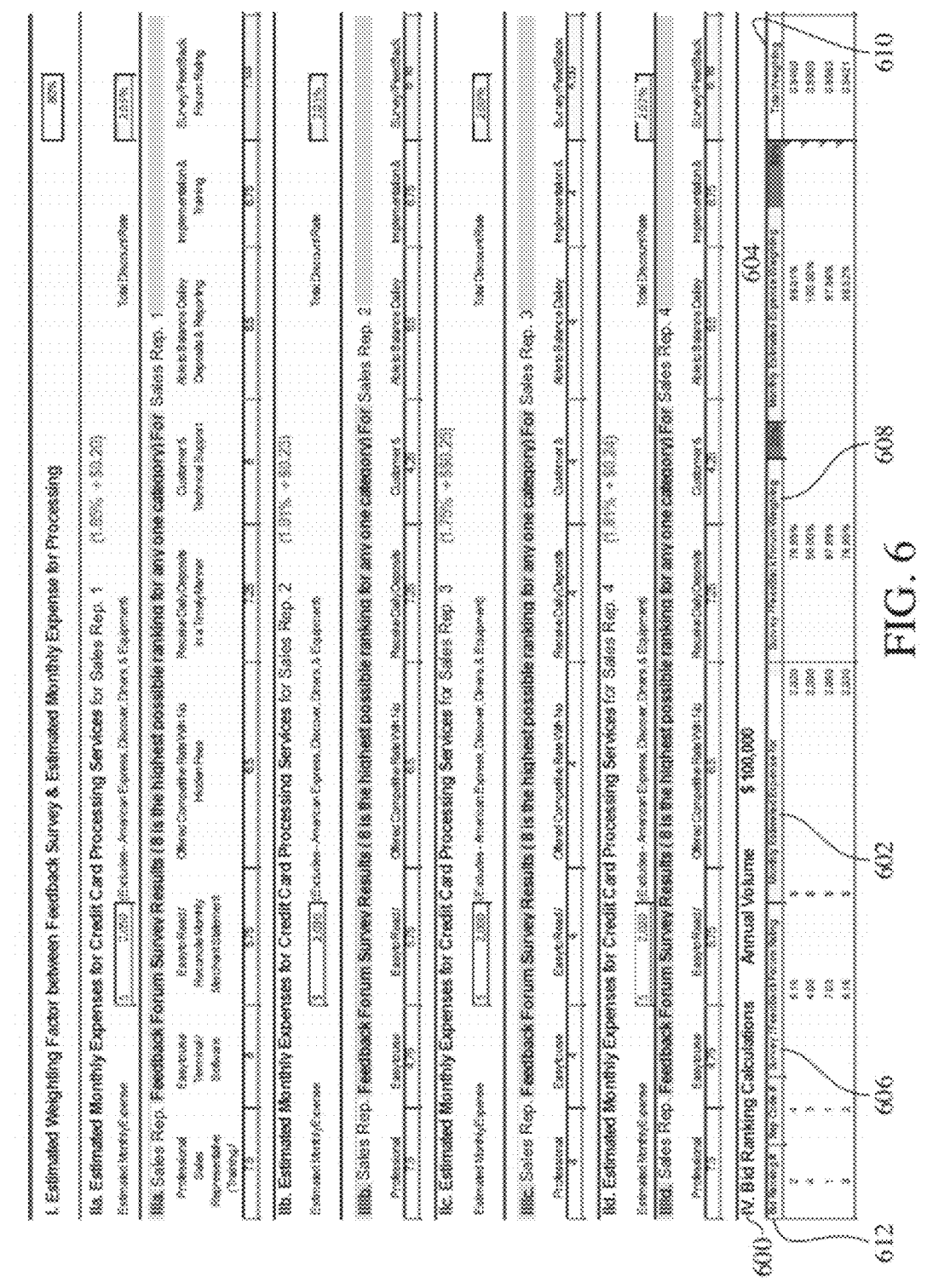

FIG. 6 is an exemplary illustration of the bid ranking calculation 600. In this example, the lowest estimated monthly expense 602 of the four exemplary sales representative bid proposals shown in FIG. 6 is $2,000 for sales representative three. Therefore, the monthly estimated expense weighting 604 for sales representative one having an estimated monthly expense of $2,050 is 97.56% ($2,000/$2,050=97.56%).

The system next determines an average survey feedback forum rating 606 for each sales representative by averaging the eight qualitative feedback categories to arrive at a single value for each sales representatives. The qualitative categories that are used to arrive at the average are (1) professional sales representative, (2) easy to use terminal/software, (3) easy to read/reconcile monthly merchant statement, (4) offered competitive rate with no hidden fees, (5) receive daily deposits in a timely manner, (6) customer & technical support, (7) able to balance daily deposits & reporting, and (8) implementation & training.

Survey feedback ratings are received as feedback 112 from prior merchants for which each sales representative has been selected as a winner in the bidding process.

The system 100 then calculates a survey feedback forum weighting 608 by dividing the average survey feedback forum rating 606 by the total possible survey feedback forum rating, which in the preferred embodiment is eight. As shown in FIG. 6, the average survey feedback forum rating 606 of sales representative one is shown to be 7.03, and therefore, the survey feedback forum weighting 608 of sales representative one is 87.89 (7.03/8=87.89%).

To calculate the top ranking bid, the system 100 takes the survey feedback forum weighting 608 and multiplies it by a weighting factor of 20%, for example, to get an interim survey feedback forum weighting value. The system 100 then takes the monthly estimated expense weighting 604 and multiples it by a weighting factor of 80%, for example, to get an interim monthly estimated expense weighting value, and then adds the interim survey feedback forum weighting value and monthly estimated expense weighting value to arrive at the total weighting 610 for each bid proposal. The bid proposals are then ranked and given a bid ranking 612 according to the total weighting 610 with the bid proposal having the highest total weighting 610 being the top ranking bid.

As shown in FIG. 6, sales representative one would have the top ranked bid proposal and a corresponding bid ranking 612 of number one. The interim survey feedback forum weighting value of sales representative one is 17.58% (87.89%×20%=17.58%). The interim monthly estimated expense weighting value of sales representative one is 78.05% (97.56%×80%=78.05%). Adding these two interim values together gives a total weighting 610 of sale representative one equal to 95.63%, which is the highest total weighting of all sales representatives.

Referring back to FIG. 1 and referenced above are the various merchant processing pricing models available to the sales representative through the sales representative portal 110, and which may be utilized during an auction to assist the sales representative in analyzing and managing its bid proposals and business of selling merchant processing services.

Macro Pricing Model

The macro pricing model 114 enables the merchant sales representative to analyze its merchant processing fees and expenses under various monetary code types (e.g., retail, hotel, supermarket, gas station transactions). The sales representative enters information into the macro pricing model 114 and the system 100 determines the sales representative's breakeven rate and monthly net revenue based on various interchange levels and values, and a merchant's monthly savings associated with a bid proposal. The model is designed so that the merchant sales representative can analyze bid proposals based on a bundled rate or an interchange pass through rate. The Macro Model is designed for a very quick estimate of what a sales representative should quote a merchant and what the sales representative can generate for revenue.

The thirty two monetary code types provided in the preferred embodiment of the system 100 and macro pricing model 114 include the following: Retail (Face to Face); Mail Order; Hotel; Supermarkets; Courts, Fines, Taxes; Restaurant; Cash Advance; Charities; Gas Stations; B2B (Large Ticket); B2B (Small Ticket); Insurance; Real Estate; Auto Dealers; Education (Continuing); Small Ticket <$15.00 (Taxi, Car Wash); E-Commerce/Internet; Car Rental; Telecom & Cable (Service Ind./Dev. Mkts); Utilities (Electric, Gas, Water, & Sanitary); Fast Food, Parking, Theater, Taxi; Health Care—Hospitals; Health Care—Doctors/Dentist; Pay @ Pump (Automated Fuel); Entertainment (Parks, Golf Courses); Travel—Other Transportation (Charter Service, Limo); Travel Operators; Travel Agents; Education (Schools/University/Colleges); Education—College Book Stores; Key Entered Miscellaneous Merchants; and ARU Miscellaneous Merchants.

Figure 7A:
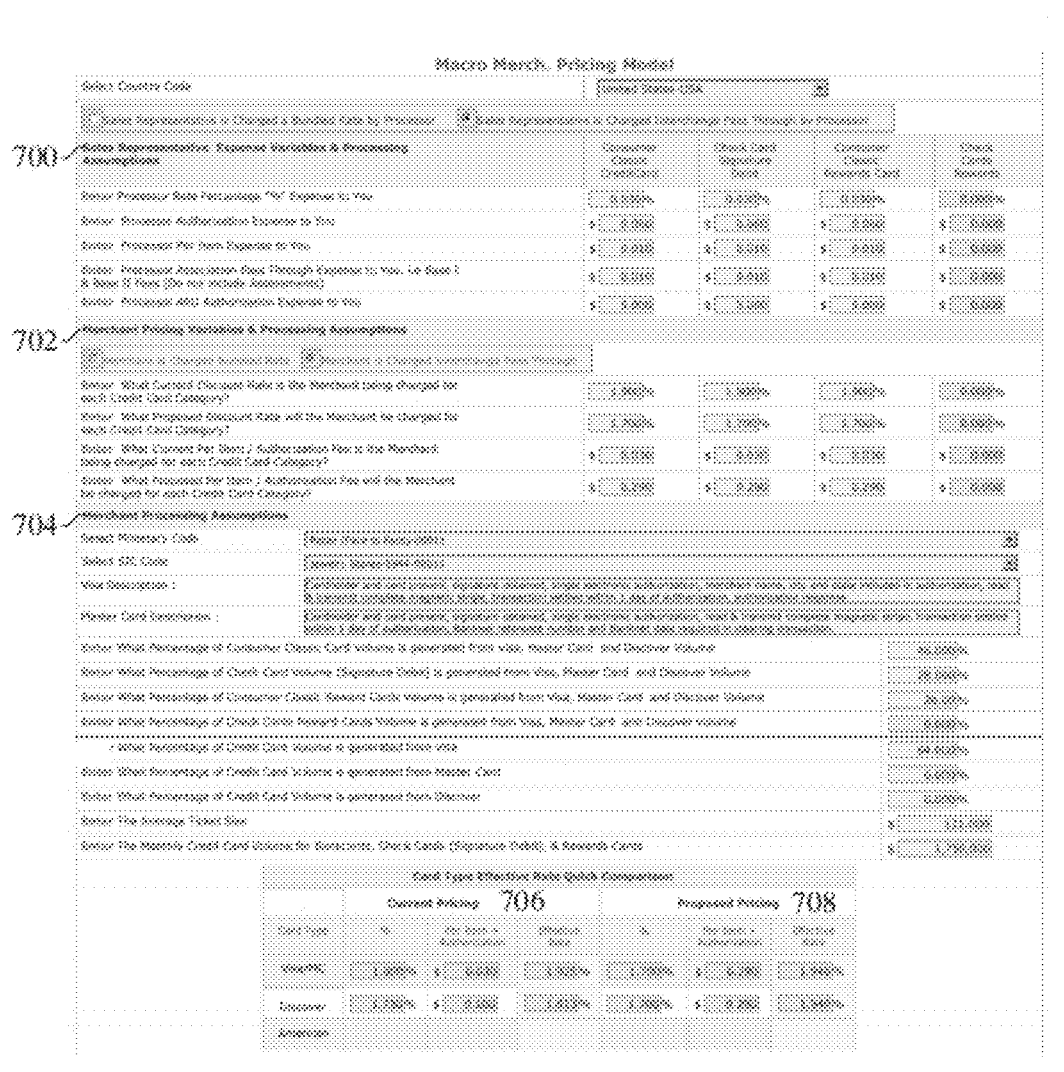
Figure 7B:
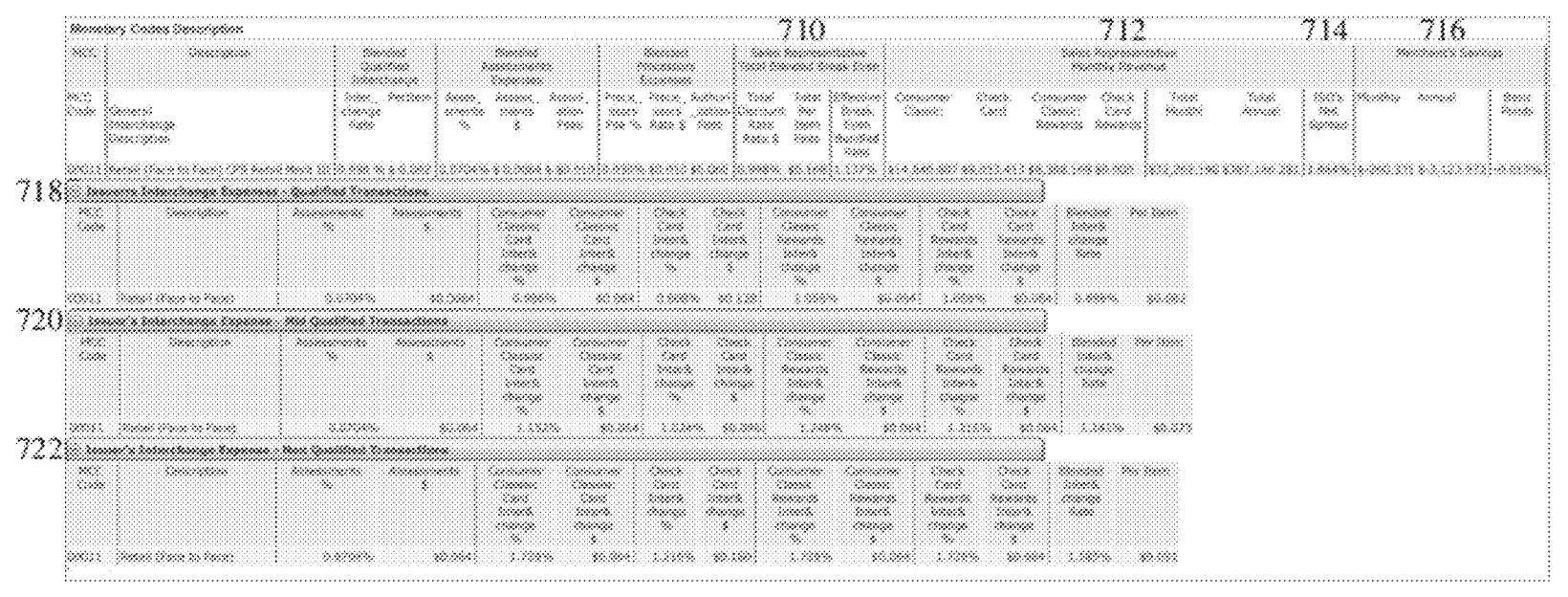

As shown in the example in FIGS. 7A and 7B, the sales representative enters information regarding the sales representative's expense variables and processing assumptions 700, merchant pricing variables and processing assumptions 702, and merchant processing assumptions 704, and the macro pricing model 114 compares the merchant's current pricing for merchant processing services 706 to the sales representative's proposed pricing 708, and calculates the effective break even rate 710, monthly and annual revenue 712, net spread 714, and monthly and annual savings to the merchant 716 associated with a bid proposal. The system assumes that the sales representative must meet or beat the existing rate that a merchant is currently paying for its merchant processing services and calculates the sales representative's revenue and breakeven rate based on this.

The macro model allows the sales representative to quickly and easily determine the various interchange rates and per item fees associated with a qualified transaction 718, partially qualified transaction 720 and non qualified transaction 722 rate for that monetary code category. The sales representative can also compare and contrast interchange rates between monetary codes for qualified, partially qualified and non qualified transactions.

Micro Pricing Model

A micro pricing model 116 enables the merchant sales representative to enter its merchant processing fees and expenses of a bid proposal to a merchant and then view detailed results in terms of monthly revenues, spreads, and merchant processor revenues.

There are approximately 50 different fields of data that can be loaded into the micro pricing model 116 by the sales representative as shown in FIGS. 8A to 8F. Once registered on the system 100 as a sales representative, the 50 fields of data will automatically populate when the merchant sales representative enters the micro pricing model 116 based on the merchant processing information entered initially on the sales representative registration or information associated with a bid proposal during an auction. The sales representative, however, may also modify the data entered in the micro pricing model 116.

The micro pricing model 116 enables the merchant sales representative to compare various pricing methods such as an interchange plus to a buy rate method or tiered rate method or a buy rate method or tiered rate method with an 80% revenue share to a flat buy rate program, in many different scenarios in order to evaluate which bank or merchant processor provides the best possible economic opportunity to the sales representative. The micro pricing model 116 allows the sales representative to modify the revenue share from 0 to 100 percent.

Using the micro pricing model 116, the sales representative is provided with a detail of its revenue potential for a bid proposal and can evaluate whether to pursue a merchant processing opportunity, pass on a merchant processing opportunity or modify a bid proposal, for example, from a bundled rate method to an interchange pass through method.

FIGS. 8A to 8F illustrates an example of a micro pricing model 116. The micro pricing model 116 includes data regarding merchant demographics 800 which includes the merchant description corresponding to a particular monetary code category, a SIC code for the merchant, percentage of swiped transactions, monthly credit card volume and average ticket size. The sales representative can hit a calculate tab for the micro pricing model to automatically populate and return its results to the sales representative based on the merchant demographics and the processing expenses and pricing provided in the sales representative registration. This includes for example the monthly volume for Visa, MasterCard and Discover as to each card type, such as consumer, signature debit, and rewards, and the volume of partially qualified and non qualified transactions.

The data populated into the micro pricing model includes the fees charged to the merchant and other billing elements 802 provided by the sales representative and the fees and other billing elements charged to the sales representative 804. The micro pricing model also includes data relating to merchant demographics broken down by Visa, MasterCard, American Express, and Discover and card type 806.

Based on this data, the micro pricing model generates a micro monthly detailed income statement 808 providing the sales representative with detailed fees and revenues related to the merchant, sales representative and processor associated with the sales representative. This includes various billing fees to the merchant, assessed fees to the sales representative, gross revenue generated by the merchant, interchange and assessment fees, net revenue, sales representative revenue, and processor revenue broken down by card type and qualified, partially qualified and non qualified transactions. Also included in the micro monthly detailed income statement 808 is a break down of processing or buy rate percentages and various other fees. The micro monthly detailed income statement 808 then totals the respective fees and revenues and basis point spread and split percentage for the sales representative.

The micro pricing model also provides a micro monthly summary 810 to the sales representative showing the sales representative's monthly gross revenue 812, expenses 814, and net revenue 816 with a summary breakdown of the various fees and expenses included in such results, such as ACH fees, batch fees, PCI fees, application fees and the like.

Statement Analysis Model

Figure 9:
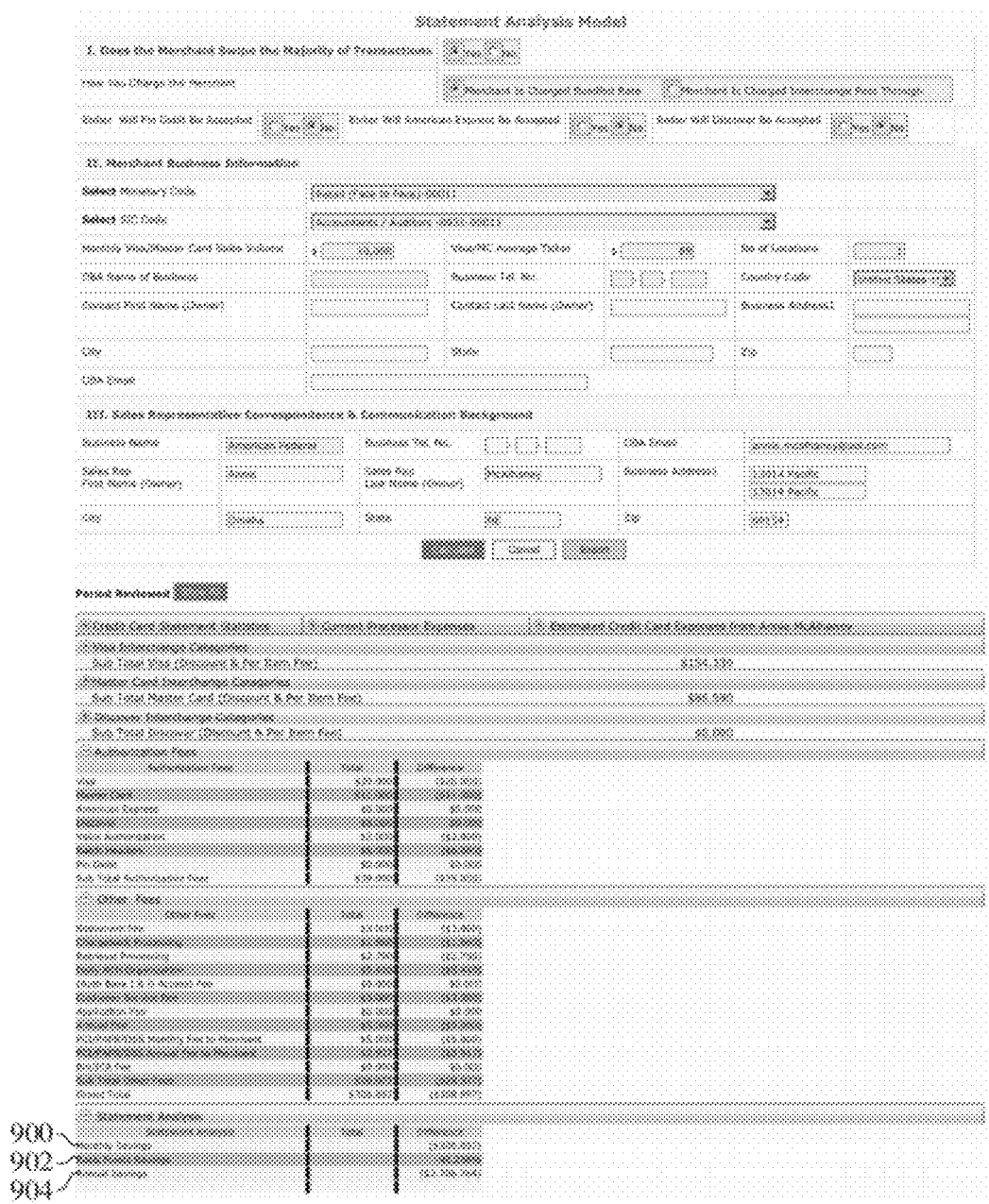
FIG. 9 illustrates an example of a statement analysis model.

The statement analysis model 118 enables the merchant sales representative to enter a merchant's current merchant processing statement and the sales representative's own pricing for each of the current billing elements. The statement analysis model 118 will then automatically calculate the savings in dollars terms and percentages, which can then be presented to the merchant. FIG. 9 illustrates an exemplary statement analysis model 118 showing the monthly savings 900, basis points savings 902 and annual savings 904 to a merchant in relation to the bid proposal or pricing of a particular sales representative.

To calculate the basis points savings, the system 100 adds up all the expenses the merchant is currently paying and divides the total expenses by the credit card volume to arrive at a current bundled rate. The system 100 then adds all the expenses the merchant would pay using the sales representative's bid proposal and divides the total expenses by the credit card volume to arrive at an estimated bundled rate. The system then subtracts the current and estimated bundled rates to determine the basis points savings.

Portfolio Valuation Model

Figure 10:
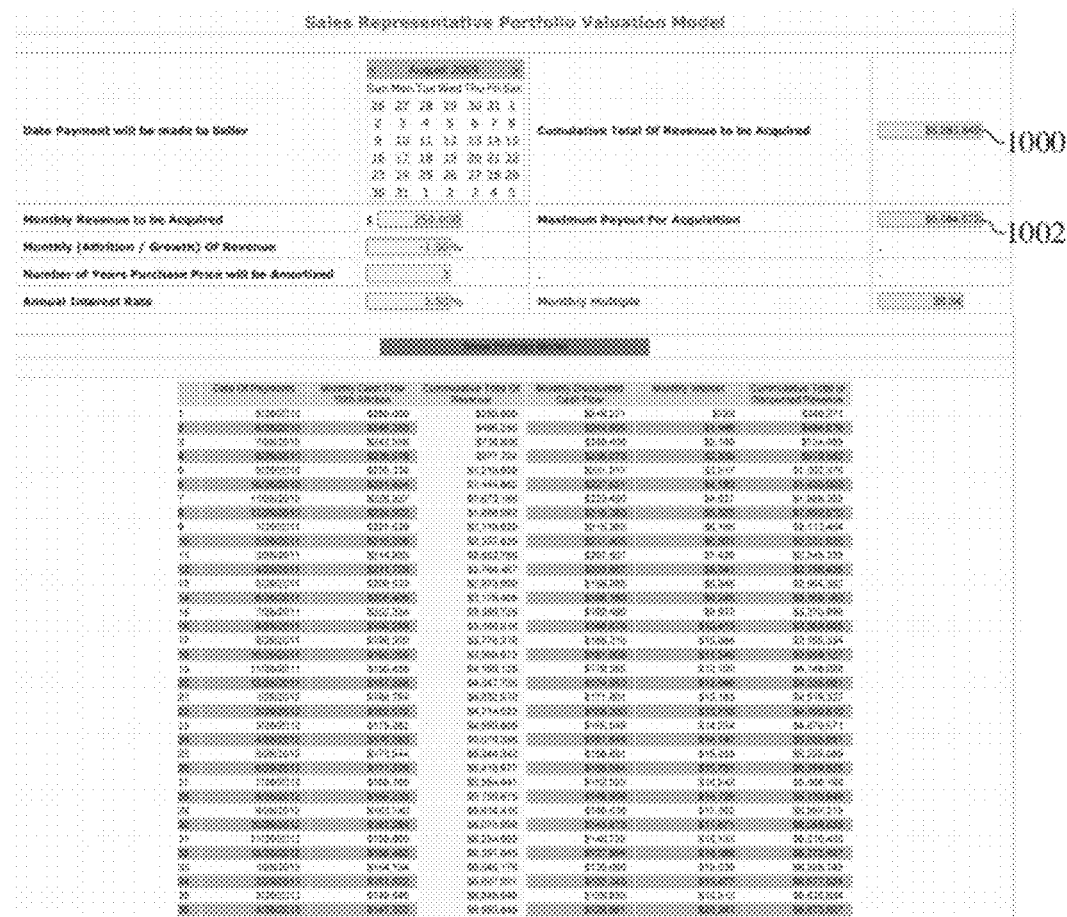
FIG. 10 illustrates an example of a portfolio valuation model.

The portfolio valuation model 120 enables the sales representative to determine how much its portfolio of merchant accounts is worth (portfolio value) or how much it would spend to acquire a merchant portfolio of another sales representative. FIG. 10 illustrates an exemplary portfolio valuation model 120 showing the cumulative total revenue of merchant accounts to be acquired 1000 and maximum payout for acquisition of the portfolio 1002.

Pin Debit Model

Figure 11:
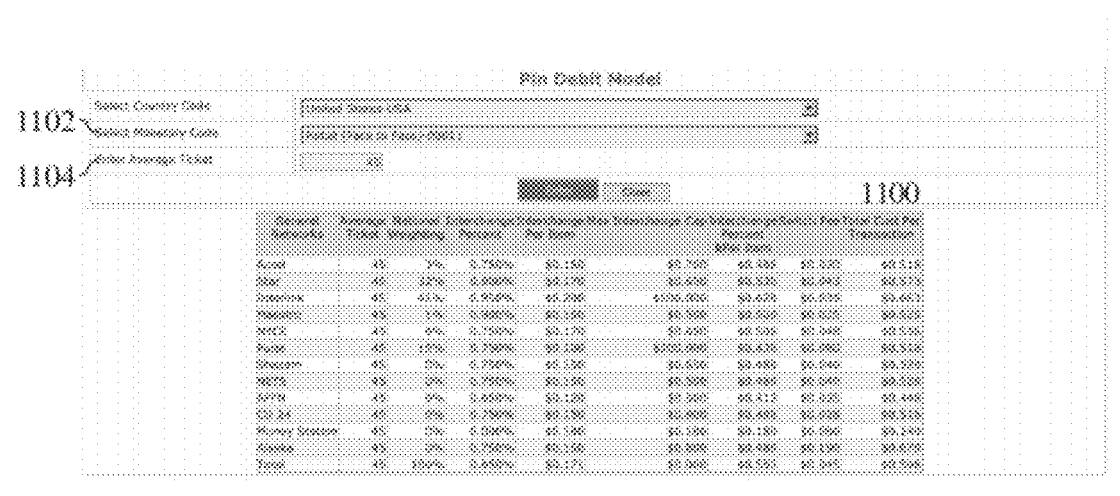

The PIN debit model 122 provides a sales representative with a calculation of the total cost per transaction and related fees associated with various PIN debit card networks based on an average ticket and monetary code selected by the sales representative. FIG. 11 illustrates and exemplary PIN debit model 122 showing the total cost per transaction 1100 and related fees for various debit networks for a retail, face-to-face (e.g., swiped) transaction 1102 having an average ticket of $45 1104.

The PIN debit model is useful to the sales representative utilizing the system 100 because there are at least 12 PIN debit networks and all 12 of them charge different percent and per item fees. The PIN debit model provides a sales representative with an accurate reflection of the estimated expense based on a weighted average of the PIN debit market mix, and thus an indication of how much to charge in its bid proposal to cover the sales representative's interchange and switch expense. The switch expense is typically the cost that a debit network assesses a merchant processor to switch pin debit transactions onto and off of its network.

Equipment Leasing Module

The system 100 provides an equipment leasing module 124 for the sales representative having a listing of merchant processing equipment and leasing pricing and terms, and an online leasing application form that can be submitted through the system 100 for leasing of such equipment.

Equipment Purchases Module

The system 100 provides an equipment purchase module 126 for sales representatives having a listing of merchant processing equipment and purchase pricing, and an online purchase application form that can be submitted through the system 100 for purchase of such equipment.

Business Credit Card Module

Through the business credit card module 128, the system 100 may also provide merchants and sales representatives with the ability to acquire small business credit cards, such as a Visa or MasterCard branded card for their own business card use. The business credit card module 128 provides the merchant or sales representative with the option of various card types and the respective rates and fees associated with each card type, and an online credit card application form that can be submitted through the system 100 for such business credit cards.

The business credit card module 128 operates through a referral relationship with a card issuer such that when a merchant or sales representative utilizes the system 100 to apply and acquire a small business credit card, the card issuer of such card pays a fee for each referral generated by the system 100, and/or at least one basis point based on their annual volume and an additional one basis point on any monthly outstandings.

Working Capital Module

Through the working capital module 130, the system 100 provides working capital advances and services to merchants, through a referral relationship with one or more identified working capital providers. The system 100 provides an online application form that can be completed and submitted through the system 100.

Payroll Processing Module

Through the payroll processing module 132, the system 100 provides payroll processing services to merchants, through a referral relationship with one of 52 or more identified payroll providers. This functionality provides guaranteed accurate paycheck calculations to the merchant including all federal, state, and local taxes.

The merchant payroll can be automatically generated by the system 100. The merchant enters the hours and can print out its paystubs and paychecks from the system 100 web site, or can offer its employees direct deposit service. The merchant can also easily export its payroll data to QuickBooks®, Quicken®, or Microsoft® Money.

In a preferred embodiment, fees are charged by the system 100 once a month, regardless of how many times the merchant is running payroll within that month. There is no extra charge for direct deposit, quarterly or year-end form filings (including W-2's).

To utilize the payroll processing module 132, the merchant logs into the site, and the system 100 provides the merchant with a personal To Do list that guides the merchant through each payroll task, from initial setup of the merchant organization and employees, to paying employees, to all federal filings and deposits throughout the year, to W-2's. In addition, the system 100 will send email reminders to the merchant as to federal tax deadlines.

The system 100 enables the merchant to make electronic federal tax payments and federal filings. The merchant can pay federal taxes and submit federal form 940 and 941 electronically with a click whenever the merchant To Do list informs the merchant that such are due. At year-end, the merchant can print employees W-2's and click to send government copies to the SSA.

The merchant can view various payroll reports such as payroll details, workers' compensation wages, federal, state, and local tax liabilities and federal payments, deduction summaries. There are 12 different report types that the merchant can export easily to Microsoft® Excel for customized reporting.

Unlike other payroll services, the system 100 does not impound funds for taxes each payroll. The merchant maintains control of its funds, and the system 100 advises the merchant exactly what and when to pay and assists the merchant in effectuating such payments.

Merchant and Sales Representative Reference Material

The merchant reference material module 134 and sales representative reference material module 136 provide merchants and sales representatives with various reference materials available in the industry related to merchant processing services for their respective businesses, such as various interchange descriptions and rates, various operating regulations for Visa and MasterCard, various merchant regulations for Visa and MasterCard, American Express and Discover pricing and reference guides. SIC codes, and PCI/CISP regulations.

Legal Resource Module

The legal resource module 138 contains various legal disclaimers and agreements associated with the use of the system 100.

Administrative Portal

The administrative portal 140 permits a system 100 administrator to manage and modify all aspects of the system 100 including each component of the system as necessary for operation of the system 100, including for example, the system 100 users, tables, reports, and reference materials. Through the administrative portal 140, an administrator can manage and modify revenue and billing summaries and collection. The administrator can also restrict certain merchant types or particular merchant or sales representative users.

The administrator can manage and modify various tables utilized by the system 100 such as SIC code tables, monetary code tables, the givens table, and other tables relating to settlement banks, and Discover and American Express rates. The administrator can further manage and modify the various vendors through which the system 100 facilitates a referral relationship, such as payroll processing, as well as the products, services and equipment available through the system 100.

The administrator can also generate summary reports from the system database not available to merchant and sales representative users, such as a report of all bid finalists or pending bids of the various auctions on the system 100.

What is claimed is:

1. A computer mediated method for auctioning merchant processing services over an electronic network, including a system computer, a merchant computer and a plurality of sales representative computers, said computers being coupled to the electronic network for communicating data among said computers, the method comprising:
    (a) receiving on said system computer merchant processing services bid request data from said merchant computer;
    (b) storing said bid request data in a bid request database on said system computer;
    (c) said system computer transmitting said bid request data to said sales representative computers;
    (d) receiving merchant processing services bid proposal data from sales representatives via said sales representative computers in response to said bid request data;
    (e) storing said bid proposals data in a bid proposal database of said system computer;
    (f) computing an estimated monthly expense for each of said merchant processing services bid proposals, wherein the estimated monthly expense is computed by summing a discount expense and other merchant processing fees and expenses, wherein said discount expense is computed by a pricing method selected from the group consisting of:
        a bundled pricing method wherein said discount expense equals a sum of a qualified discount expense by percent and a qualified discount expense per settled item, where said qualified discount expense by percent is equal to the sum of a monthly card type volume multiplied by a rate for each transaction by credit card type, and said qualified discount expense per settled item equals the sum of monthly card type transactions multiplied by a per item charge; and
        an interchange pass through method wherein said discount expense equals a sum of each monthly card type volume divided as to qualified, partially qualified and non-qualified transaction types and multiplied by an interchange pass through rate for each qualified, partially qualified, and non-qualified transaction type;
    (g) computing a bid ranking for each of said merchant processing services bid proposals based on said estimated monthly expense and qualitative feedback from merchants that have selected said sales representatives to provide merchant processing services, wherein the bid ranking is computed by multiplying a feedback forum weighting by a weighting factor percentage to determine an interim feedback weighting value and multiplying a monthly estimated expense weighting by a weighting factor percentage to determine an interim monthly estimated expense value and then adding said interim feedback weighting value and said interim monthly estimated expense value to determine a total bid weighting for said bid ranking;
    (h) communicating said estimated monthly expense and said bid ranking to said merchant computer over said electronic network;
    (i) communicating said bid ranking to said sales representative computers over said electronic network; and
    (j) allowing each of said sales representatives to change its bid proposal data in consideration of said bid ranking.

2. The method of claim 1 wherein said monthly estimated expense weighting for each sales representative bid proposal is automatically computed by said system computer by dividing a lowest estimated monthly expense of all submitted bid proposals by an estimated monthly expense for each sales representative bid proposal.

3. The method of claim 2 wherein said feedback forum weighting is computed by dividing an average feedback forum rating by a total number of qualitative feedback categories rated by merchants.

4. The method of claim 3 further comprising a macro pricing model, wherein said macro pricing model generates a monthly net revenue and a breakeven rate associated with a sales representative's fees and expenses for merchant processing services.

5. The method of claim 4 wherein the macro pricing model further generates a monthly savings to the merchant associated with a sales representative's fees and expenses for merchant processing services.

6. The method of claim 5 further comprising a micro pricing model, wherein said micro pricing model generates a monthly gross revenue, a monthly expense, and a monthly net revenue associated with a sales representative's fees and expenses for merchant processing services.

7. The method of claim 6 wherein said micro pricing model further generates a monthly detailed income statement associated with a sales representative's fees and expenses for merchant processing services.

8. The method of claim 7 further comprising a statement analysis model, wherein said statement analysis model compares a merchant's current fees and expenses for merchant processing services to a sales representative's fees and expenses for merchant processing services and generates a monthly savings in dollars and percent and a basis points savings to said merchant associated with the sales representative's fees and expenses for merchant processing services.

9. The method of claim 8 further comprising a portfolio valuation model, wherein said portfolio valuation model computes a cumulative total revenue of merchant accounts to be acquired and a maximum payout for acquisition of a merchant processing portfolio.

10. The method of claim 9 further comprising a PIN debit model, wherein said PIN debit model computes a total cost per transaction and fees associated with a debit network.

11. The method of claim 10 further comprising an equipment leasing module and equipment purchasing module for leasing and purchasing merchant processing equipment by said sales representatives.

12. The method of claim 11 further comprising a business credit card module for acquiring small business credit cards by said merchants and sales representatives.

13. The method of claim 12 further comprising a working capital module for acquiring working capital advances and services by said merchants.

14. The method of claim 13 further comprising a payroll processing module for acquiring payroll processing services by said merchants.

15. The method of claim 14 further comprising a merchant reference material module and sales representative reference material module for acquiring industry reference material regarding merchant processing services.

16. The method of claim 15 further comprising a legal resource module for acquiring legal agreements by said merchants and sales representatives.

17. The method of claim 16 further comprising an administrative portal for managing said system computer.

18. The method of claim 17 wherein said qualitative feedback categories comprise:
   (a) a qualitative category for the professional sales representative;
   (b) a qualitative category for an easy to use terminal and software;
   (c) a qualitative category for an easy to read and reconcile monthly merchant statement;
   (d) a qualitative category for an offered competitive rate with no hidden fees;
   (e) a qualitative category for receipt of daily deposits in a timely manner;
   (f) a qualitative category for customer and technical support;
   (g) a qualitative category for an ability to balance daily deposits and reporting;
   (h) a qualitative category for implementation and training.

19. A computer mediated method for auctioning merchant processing services over an electronic network, including a system computer, a merchant computer and a plurality of sales representative computers, said computers being coupled to the electronic network for communicating data among said computers, the method comprising:
   (a) receiving on said system computer merchant processing services bid request data from said merchant computer;
   (b) storing said bid request data in a bid request database on said system computer;
   (c) said system computer transmitting said bid request data to said sales representative computers;
   (d) receiving merchant processing services bid proposal data from sales representatives via said sales representative computers in response to said bid request data;
   (e) storing said bid proposals data in a bid proposal database of said system computer;
   (f) computing an estimated monthly expense for each of said merchant processing services bid proposals;
   (g) computing a bid ranking for each of said merchant processing services bid proposals based on said estimated monthly expense and qualitative feedback from merchants that have selected said sales representatives to provide merchant processing services, wherein the bid ranking is computed by multiplying a feedback forum weighting by a weighting factor percentage to determine an interim feedback weighting value and multiplying a monthly estimated expense weighting by a weighting factor percentage to determine an interim monthly estimated expense value and then adding said interim feedback weighting value and said interim monthly estimated expense value to determine a total bid weighting for said bid ranking;
   (h) communicating said estimated monthly expense and said bid ranking to said merchant computer over said electronic network;
   (i) communicating said bid ranking to said sales representative computers over said electronic network; and
   (j) allowing each of said sales representatives to change its bid proposal data in consideration of said bid ranking.

* * * * *